US009423935B2

(12) United States Patent
Ebina et al.

(10) Patent No.: US 9,423,935 B2
(45) Date of Patent: Aug. 23, 2016

(54) TERMINAL APPARATUS AND GUI SCREEN GENERATION METHOD

(71) Applicant: PANASONIC CORPORATION, Osaka (JP)

(72) Inventors: Akihiro Ebina, Kyoto (JP); Yoshifumi Sakata, Osaka (JP); Seiji Kubo, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 605 days.

(21) Appl. No.: 13/728,632

(22) Filed: Dec. 27, 2012

(65) Prior Publication Data

US 2013/0125064 A1     May 16, 2013

Related U.S. Application Data

(63) Continuation of application No. PCT/JP2011/003905, filed on Jul. 7, 2011.

(30) Foreign Application Priority Data

Jul. 7, 2010   (JP) ................................ 2010-154586

(51) Int. Cl.
    *G06F 3/048*      (2013.01)
    *G06F 3/0484*      (2013.01)
    *G06F 3/01*      (2006.01)
    *G06F 3/0488*      (2013.01)
    *H04N 21/422*      (2011.01)
    (Continued)

(52) U.S. Cl.
    CPC ............ *G06F 3/04842* (2013.01); *G06F 3/017* (2013.01); *G06F 3/0418* (2013.01); *G06F 3/0482* (2013.01); *G06F 3/0488* (2013.01); *H04N 21/4221* (2013.01); *H04N 21/4223* (2013.01); *H04N 21/44008* (2013.01); *H04N 21/44218* (2013.01); *H04N 21/4821* (2013.01)

(58) Field of Classification Search
None
See application file for complete search history.

(56) References Cited

U.S. PATENT DOCUMENTS 5,448,261 A    9/1995   Koike et al.
5,554,980 A    9/1996   Hashimoto et al.
(Continued)

FOREIGN PATENT DOCUMENTS

JP      03-022014      1/1991
JP      06-038127 A      2/1994
(Continued)

OTHER PUBLICATIONS

International Search Report issued in International Patent Application No. PCT/JP2011/003905 dated Oct. 18, 2011.

*Primary Examiner* — William Trapanese
(74) *Attorney, Agent, or Firm* — McDermott Will & Emery LLP

(57) ABSTRACT

A terminal apparatus operates according to manipulation by a user on a Graphical User Interface (GUI) screen. The terminal apparatus includes: a generator that generates the GUI screen, the GUI screen including an object selectable in the manipulation and a pointer for selecting the object; and a blur calculator that calculates a vertical blur amount and a horizontal blur amount of a position at which the pointer is displayed on the GUI screen. The generator changes the GUI screen in a vertical direction depending on the vertical blur amount, and changes the GUI screen in a horizontal direction depending on the horizontal blur amount.

12 Claims, 14 Drawing Sheets

(51) Int. Cl.
*H04N 21/4223* (2011.01)
*H04N 21/44* (2011.01)
*H04N 21/442* (2011.01)
*H04N 21/482* (2011.01)
*G06F 3/041* (2006.01)
*G06F 3/0482* (2013.01)

(56) References Cited

U.S. PATENT DOCUMENTS

| | | | |
|---|---|---|---|
| 2004/0017401 A1* | 1/2004 | Strong | G06F 3/0488 |
| | | | 715/821 |
| 2005/0088409 A1 | 4/2005 | Van Berkel | |
| 2005/0262447 A1 | 11/2005 | Shoemaker | |
| 2006/0026537 A1 | 2/2006 | L'Heureux | |
| 2006/0143577 A1 | 6/2006 | Hsieh et al. | |
| 2008/0055259 A1* | 3/2008 | Plocher | G06F 3/04886 |
| | | | 345/173 |
| 2010/0188334 A1 | 7/2010 | Yamamoto et al. | |
| 2011/0057886 A1* | 3/2011 | Ng | G06F 3/0482 |
| | | | 345/173 |
| 2011/0221776 A1 | 9/2011 | Shimotani et al. | |
| 2011/0234639 A1 | 9/2011 | Shimotani et al. | |
| 2011/0254865 A1* | 10/2011 | Yee et al. | 345/661 |

FOREIGN PATENT DOCUMENTS

| | | |
|---|---|---|
| JP | 07-284166 A | 10/1995 |
| JP | 2002-222043 A | 8/2002 |
| JP | 2004-023161 A | 1/2004 |
| JP | 2004-170708 A | 6/2004 |
| JP | 2004-258837 A | 9/2004 |
| JP | 2007-190947 A | 8/2007 |
| JP | 2008-265544 A | 11/2008 |
| WO | WO-2010/064388 A1 | 6/2010 |
| WO | WO-2010/064423 A1 | 6/2010 |

\* cited by examiner

FIG. 5

| Horizontal blur amount \ Vertical blur amount | Small (Blur amount ≦ 50) | Medium (50 < Blur amount < 100) | Large (Blur amount ≧ 100) |
|---|---|---|---|
| Small (Blur amount ≦ 50) | GUI screen A | GUI screen B | GUI screen C |
| Medium (50 < Blur amount < 100) | GUI screen D | GUI screen E | GUI screen F |
| Large (Blur amount ≧ 100) | GUI screen G | GUI screen H | GUI screen I |

GUI screen A (Vertical blur amount : Small
Horizontal blur amount : Small)

GUI screen B (Vertical blur amount : Medium
Horizontal blur amount : Small)

GUI screen C (Vertical blur amount : Large
Horizontal blur amount : Small)

GUI screen D (Vertical blur amount : Small
Horizontal blur amount : Medium)

GUI screen E (Vertical blur amount : Medium
Horizontal blur amount : Medium)

GUI screen F (Vertical blur amount : Large
Horizontal blur amount : Medium)

GUI screen G (Vertical blur amount : Small
Horizontal blur amount : Large)

GUI screen H (Vertical blur amount : Medium
Horizontal blur amount : Large)

GUI screen I (Vertical blur amount : Large
Horizontal blur amount : Large)

FIG. 16

| Position precision | Number of objects | Screen example |
|---|---|---|
| High (Blur amount:Small) | Large | |
| Low (Blur amount:Large) | Small | |

TERMINAL APPARATUS AND GUI SCREEN GENERATION METHOD

CROSS REFERENCE TO RELATED APPLICATIONS

This is a continuation application of PCT International Application No. PCT/JP2011/003905 filed on Jul. 7, 2011, designating the United States of America, which is based on and claims priority of Japanese Patent Application No. 2010-154586 filed on Jul. 7, 2010. The entire disclosures of the above-identified applications, including the specifications, drawings and claims are incorporated herein by reference in their entirety.

FIELD

One or more exemplary embodiments disclosed herein relate generally to a terminal apparatus that operates according to manipulation by a user on a Graphical User Interface (GUI) screen.

BACKGROUND

A terminal apparatus that can be manipulated with a pointer (also called a cursor) on a GUI screen is conventionally available. The GUI screen is a manipulation screen made up of images.

For example, a cursor control apparatus for a television receiver (also called a television apparatus) such as a liquid crystal television is described in Patent Literature (PTL) 1. The cursor control apparatus obtains, based on an infrared signal from a remote control, two-dimensional position information (position) corresponding to a position of the remote control, as remote control coordinates. The cursor control apparatus displays a cursor on a display unit, based on the remote control coordinates. The cursor control apparatus also stores the obtained remote control coordinates in a storage means.

Here, the cursor control apparatus determines whether the cursor is moving or stationary. In the case where the cursor is moving, the cursor control apparatus uses the current remote control coordinates as cursor coordinates. In the case where the cursor is stationary, on the other hand, the cursor control apparatus uses the remote control coordinates stored in the storage means as cursor coordinates.

CITATION LIST

Patent Literature

[PTL 1]
Japanese Unexamined Patent Application Publication No. 6-038127

SUMMARY

Technical Problem

The cursor control apparatus described above uses the already obtained remote control coordinates, in the case of determining that the cursor is stationary. The cursor control apparatus can thus prevent blur caused by hand movement in the case where the cursor is stationary.

However, blur caused by hand movement also occurs in the case where the cursor is moving. Such blur may make it difficult to move the cursor to appropriately select an object displayed on the television receiver. Besides, in order to prevent blur caused by hand movement while the cursor is moving, it is necessary to determine the amount of movement by cursor manipulation and the amount of movement by blur, which requires complex processing.

One non-limiting and exemplary embodiment provides a terminal apparatus that enables a user to appropriately select an object on a GUI screen even in the case where blur occurs.

Solution to Problem

In one general aspect, the techniques disclosed here feature a terminal apparatus that operates according to manipulation by a user on a Graphical User Interface (GUI) screen, the terminal apparatus including: a GUI screen generation unit that generates the GUI screen, the GUI screen including an object selectable in the manipulation and a pointer for selecting the object; and a blur information calculation unit that calculates blur information indicating a blur amount of a position at which the pointer is displayed on the GUI screen, wherein the GUI screen generation unit changes the GUI screen depending on the blur information.

With this, the terminal apparatus can generate the appropriate GUI screen according to the blur information. The user can then manipulate the terminal apparatus on the GUI screen according to blur, even in the case where blur caused by hand movement of the user or a display error caused by signal processing occurs. This contributes to improved manipulability of the terminal apparatus.

Moreover, the terminal apparatus may further include: an imaging unit that obtains an image of the user by imaging the user; and a position calculation unit that calculates the position from the image obtained by the imaging unit, wherein the blur information calculation unit calculates the blur information indicating the blur amount of the position calculated by the position calculation unit, from the image obtained by the imaging unit.

With this, the terminal apparatus calculates the position of the pointer based on the image of the user. The terminal apparatus then generates the GUI screen according to blur of the image of the user. There is a high possibility that the image of the user is blurred due to a property of the imaging unit or an operation by the user. Even in such a case where the image of the user is blurred, the terminal apparatus enables the user to appropriately select the object on the GUI screen according to the blur of the image.

Moreover, the GUI screen generation unit may: change a size of the object included in the GUI screen depending on the blur information; and generate the GUI screen that includes the object having the changed size and the pointer.

With this, the terminal apparatus can generate the GUI screen on which the object of the size according to blur is displayed. Therefore, even in the case where blur occurs, the user can manipulate the terminal apparatus on the GUI screen on which the object of the size according to the blur is displayed.

Moreover, the GUI screen generation unit may: generate the GUI screen that includes the object whose size is a first size and the pointer, in the case where the blur amount indicated by the blur information is a first value; and generate the GUI screen that includes the object whose size is a second size and the pointer, in the case where the blur amount indicated by the blur information is a second value larger than the first value, the second size being larger than the first size.

With this, the terminal apparatus can increase the size of the object displayed on the GUI screen in the case where the blur amount is large. Therefore, even in the case where the blur amount is large, the user can appropriately select the object displayed on the GUI screen.

Moreover, the blur information calculation unit may calculate the blur information indicating at least one of a vertical blur amount and a horizontal blur amount.

With this, the terminal apparatus can calculate blur in a predetermined direction, and change the GUI screen according to the blur in the predetermined direction.

Moreover, the blur information calculation unit may calculate the blur information indicating the vertical blur amount, wherein the GUI screen generation unit: generates the GUI screen that includes the object whose vertical size is the first size and the pointer, in the case where the vertical blur amount is the first value; and generates the GUI screen that includes the object whose vertical size is the second size and the pointer, in the case where the vertical blur amount is the second value.

With this, the terminal apparatus can vertically increase the size of the object displayed on the GUI screen, in the case where the vertical blur amount is large. Therefore, even in the case where vertical blur occurs, the user can appropriately select the object displayed on the GUI screen.

Moreover, the blur information calculation unit may calculate the blur information indicating the horizontal blur amount, wherein the GUI screen generation unit: generates the GUI screen that includes the object whose horizontal size is the first size and the pointer, in the case where the horizontal blur amount is the first value; and generates the GUI screen that includes the object whose horizontal size is the second size and the pointer, in the case where the horizontal blur amount is the second value.

With this, the terminal apparatus can horizontally increase the size of the object displayed on the GUI screen, in the case where the horizontal blur amount is large. Therefore, even in the case where horizontal blur occurs, the user can appropriately select the object displayed on the GUI screen.

Moreover, the GUI screen generation unit may: determine the number of display target objects depending on the blur information calculated by the blur information calculation unit, the display target objects being one or more objects that include the object and are displayed on the GUI screen; and generate the GUI screen on which the determined number of the display target objects are displayed.

With this, the terminal apparatus can generate the GUI screen including the number of objects according to blur. Therefore, even in the case where blur occurs, the user can manipulate the terminal apparatus on the GUI screen including the number of objects according to the blur.

Moreover, the GUI screen generation unit may: determine a first number as the number of the display target objects and generate the GUI screen on which the first number of the display target objects are displayed, in the case where the blur amount indicated by the blur information is a first value; and determine a second number as the number of the display target objects and generate the GUI screen on which the second number of the display target objects are displayed, in the case where the blur amount indicated by the blur information is a second value larger than the first value, the second number being smaller than the first number.

With this, the terminal apparatus can reduce the number of objects displayed on the GUI screen in the case where the blur amount is large, as compared with the case where the blur amount is small. Therefore, even in the case where the blur amount is large, the user can appropriately select the object.

Moreover, the blur information calculation unit may calculate the blur information indicating a vertical blur amount, wherein the GUI screen generation unit: determines the first number as the number of the display target objects displayed in the vertical direction and generates the GUI screen on which the first number of the display target objects are displayed in the vertical direction, in the case where the vertical blur amount is the first value; and determines the second number as the number of the display target objects displayed in the vertical direction and generates the GUI screen on which the second number of the display target objects are displayed in the vertical direction, in the case where the vertical blur amount is the second value.

With this, the terminal apparatus can reduce the number of objects displayed in the vertical direction, in the case where the vertical blur amount is large. Therefore, even in the case where vertical blur occurs, the user can appropriately select the object displayed on the GUI screen.

Moreover, the blur information calculation unit may calculate the blur information indicating a horizontal blur amount, wherein the GUI screen generation unit: determines the first number as the number of the display target objects displayed in the horizontal direction and generates the GUI screen on which the first number of the display target objects are displayed in the horizontal direction, in the case where the horizontal blur amount is the first value; and determines the second number as the number of the display target objects displayed in the horizontal direction and generates the GUI screen on which the second number of the display target objects are displayed in the horizontal direction, in the case where the horizontal blur amount is the second value.

With this, the terminal apparatus can reduce the number of objects displayed in the horizontal direction, in the case where the horizontal blur amount is large. Therefore, even in the case where horizontal blur occurs, the user can appropriately select the object displayed on the GUI screen.

In another general aspect, the techniques disclosed here may feature a GUI screen generation method of generating a Graphical User Interface (GUI) screen for manipulation by a user, the GUI screen generation method including: generating the GUI screen, the GUI screen including an object selectable in the manipulation and a pointer for selecting the object; and calculating blur information indicating a blur amount of a position at which the pointer is displayed on the GUI screen, wherein the generating includes changing the GUI screen depending on the blur information.

With this, the operation of the terminal apparatus is implemented as a GUI screen generation method.

In another general aspect, the techniques disclosed here may feature a computer program for causing a computer to execute the GUI screen generation method.

With this, the GUI screen generation method is implemented as a program.

In another general aspect, the techniques disclosed here may feature a terminal apparatus that operates according to manipulation by a user on a Graphical User Interface (GUI) screen, the terminal apparatus including: a generator that generates the GUI screen, the GUI screen including an object selectable in the manipulation and a pointer for selecting the object; and a blur calculator that calculates a vertical blur amount and a horizontal blur amount of a position at which the pointer is displayed on the GUI screen, wherein the generator changes the GUI screen in a vertical direction depending on the vertical blur amount, and changes the GUI screen in a horizontal direction depending on the horizontal blur amount.

Moreover, the terminal apparatus may further include: an image sensor that obtains an image of the user by imaging the user; and a position calculator that calculates the position from the image obtained by the image sensor, wherein the blur calculator calculates the vertical blur amount and the horizontal blur amount of the position calculated by the position calculator, from the image obtained by the image sensor.

Moreover, the generator may: change a vertical size of the object included in the GUI screen depending on the vertical blur amount, and change a horizontal size of the object depending on the horizontal blur amount; and generate the GUI screen that includes the object having the changed vertical size and the changed horizontal size and the pointer.

Moreover, the generator may: generate the GUI screen that includes the object whose vertical size is a first size and the pointer, in the case where the vertical blur amount is a first value; and generate the GUI screen that includes the object whose vertical size is a second size and the pointer, in the case where the vertical blur amount is a second value larger than the first value, the second size being larger than the first size.

Moreover, the generator may: generate the GUI screen that includes the object whose horizontal size is a third size and the pointer, in the case where the horizontal blur amount is a third value; and generate the GUI screen that includes the object whose horizontal size is a fourth size and the pointer, in the case where the horizontal blur amount is a fourth value larger than the third value, the fourth size being larger than the third size.

Moreover, the generator may: determine the number of vertical display target objects depending on the vertical blur amount calculated by the blur calculator, the vertical display target objects being one or more objects that include the object and are displayed in the vertical direction; determine the number of horizontal display target objects depending on the horizontal blur amount calculated by the blur calculator, the horizontal display target objects being one or more objects that include the object and are displayed in the horizontal direction; and generate the GUI screen on which the determined number of the vertical display target objects are displayed in the vertical direction and the determined number of the horizontal display target objects are displayed in the horizontal direction.

Moreover, the generator may: determine a first number as the number of the vertical display target objects displayed in the vertical direction and generate the GUI screen on which the first number of the vertical display target objects are displayed in the vertical direction, in the case where the vertical blur amount is a first value; and determine a second number as the number of the vertical display target objects displayed in the vertical direction and generate the GUI screen on which the second number of the vertical display target objects are displayed in the vertical direction, in the case where the vertical blur amount is a second value larger than the first value, the second number being smaller than the first number.

Moreover, the generator may: determine a third number as the number of the horizontal display target objects displayed in the horizontal direction and generate the GUI screen on which the third number of the horizontal display target objects are displayed in the horizontal direction, in the case where the horizontal blur amount is a third value; and determine a fourth number as the number of the horizontal display target objects displayed in the horizontal direction and generate the GUI screen on which the fourth number of the horizontal display target objects are displayed in the horizontal direction, in the case where the horizontal blur amount is a fourth value larger than the third value, the fourth number being smaller than the third number.

Moreover, the generator may generate the GUI screen on which the determined number of the vertical display target objects are displayed in the vertical direction and the determined number of the horizontal display target objects are displayed in the horizontal direction, while maintaining a size of each of the vertical display target objects and the horizontal display target objects.

Moreover, the generator may: generate the GUI screen that includes the object whose vertical size is a first size and the pointer, in the case where the vertical blur amount is a first value; and generate the GUI screen that includes the object whose vertical size is a second size and the pointer, in the case where the vertical blur amount is a second value larger than the first value, the second size being smaller than the first size.

Moreover, the generator may: generate the GUI screen that includes the object whose horizontal size is a third size and the pointer, in the case where the horizontal blur amount is a third value; and generate the GUI screen that includes the object whose horizontal size is a fourth size and the pointer, in the case where the horizontal blur amount is a fourth value larger than the third value, the fourth size being smaller than the third size.

Moreover, the generator may: generate the GUI screen on which a plurality of objects including the object are displayed, only in the case where a calculated blur amount is a first value from among the first value and a second value larger than the first value, the calculated blur amount being the calculated vertical blur amount or the calculated horizontal blur amount; and generate the GUI screen on which a substitute object is displayed, in the case where the calculated blur amount is the second value, the substitute object being an object selectable in the manipulation and substituted for the plurality of objects.

Moreover, the generator may: generate the GUI screen on which the plurality of objects are displayed, only in the case where the calculated blur amount is the first value from among the first value and the second value, the plurality of objects being objects for selecting numbers in the manipulation; and generate the GUI screen on which the substitute object is displayed, in the case where the calculated blur amount is the second value, the substitute object being an object for increasing or decreasing a number in the manipulation.

Moreover, the generator may: generate the GUI screen on which the plurality of objects are displayed, only in the case where the calculated blur amount is the first value from among the first value and the second value, the plurality of objects being objects for selecting channel numbers in the manipulation; and generate the GUI screen on which the substitute object is displayed, in the case where the calculated blur amount is the second value, the substitute object being an object for increasing or decreasing a channel number in the manipulation.

In another general aspect, the techniques disclosed here may feature a terminal apparatus that operates according to manipulation by a user on a Graphical User Interface (GUI) screen, the terminal apparatus including: a generator that generates the GUI screen, the GUI screen including a plurality of objects each of which is selectable in the manipulation and a pointer for selecting one of the plurality of objects; and a blur calculator that calculates a blur amount of a position at which the pointer is displayed on the GUI screen, wherein the generator: generates the GUI screen on which the plurality of objects are displayed, only in the case where the calculated blur amount is a first value from among the first value and a second value larger than the first value; and generates the GUI screen on which a substitute object is displayed, in the case where the calculated blur amount is the second value, the substitute object being an object selectable in the manipulation and substituted for the plurality of objects.

Moreover, the generator may: generate the GUI screen on which the plurality of objects are displayed, only in the case where the calculated blur amount is the first value from among the first value and the second value, the plurality of objects being objects for selecting numbers in the manipulation; and generate the GUI screen on which the substitute object is displayed, in the case where the calculated blur amount is the second value, the substitute object being an object for increasing or decreasing a number in the manipulation.

Moreover, the generator may: generate the GUI screen on which the plurality of objects are displayed, only in the case where the calculated blur amount is the first value from among the first value and the second value, the plurality of objects being objects for selecting channel numbers in the manipulation; and generate the GUI screen on which the substitute object is displayed, in the case where the calculated blur amount is the second value, the substitute object being an object for increasing or decreasing a channel number in the manipulation.

In another general aspect, the techniques disclosed here may feature a GUI screen generation method of generating a Graphical User Interface (GUI) screen for manipulation by a user, the GUI screen generation method including: generating the GUI screen, the GUI screen including an object selectable in the manipulation and a pointer for selecting the object; and calculating a vertical blur amount and a horizontal blur amount of a position at which the pointer is displayed on the GUI screen, wherein the generating includes changing the GUI screen in a vertical direction depending on the vertical blur amount, and changing the GUI screen in a horizontal direction depending on the horizontal blur amount.

In another general aspect, the techniques disclosed here may feature a non-transitory computer-readable recording medium for use in a computer, the recording medium having a computer program recorded thereon for causing the computer to execute the GUI screen generation method.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

One or more exemplary embodiments or features disclosed herein provide a terminal apparatus that enables a user to appropriately select an object on a GUI screen even in the case where blur occurs.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 5 is a diagram showing a table of GUI screen information referenced to by a GUI screen generation unit according to Embodiment 1.

FIG. 16 is a diagram showing an example of a GUI screen according to Embodiment 2.

DESCRIPTION OF EMBODIMENTS

Embodiment 1

1. Television Apparatus and its Peripherals

The following describes a television apparatus which is an example of a terminal apparatus according to this exemplary embodiment, with reference to drawings.

Figure 1:
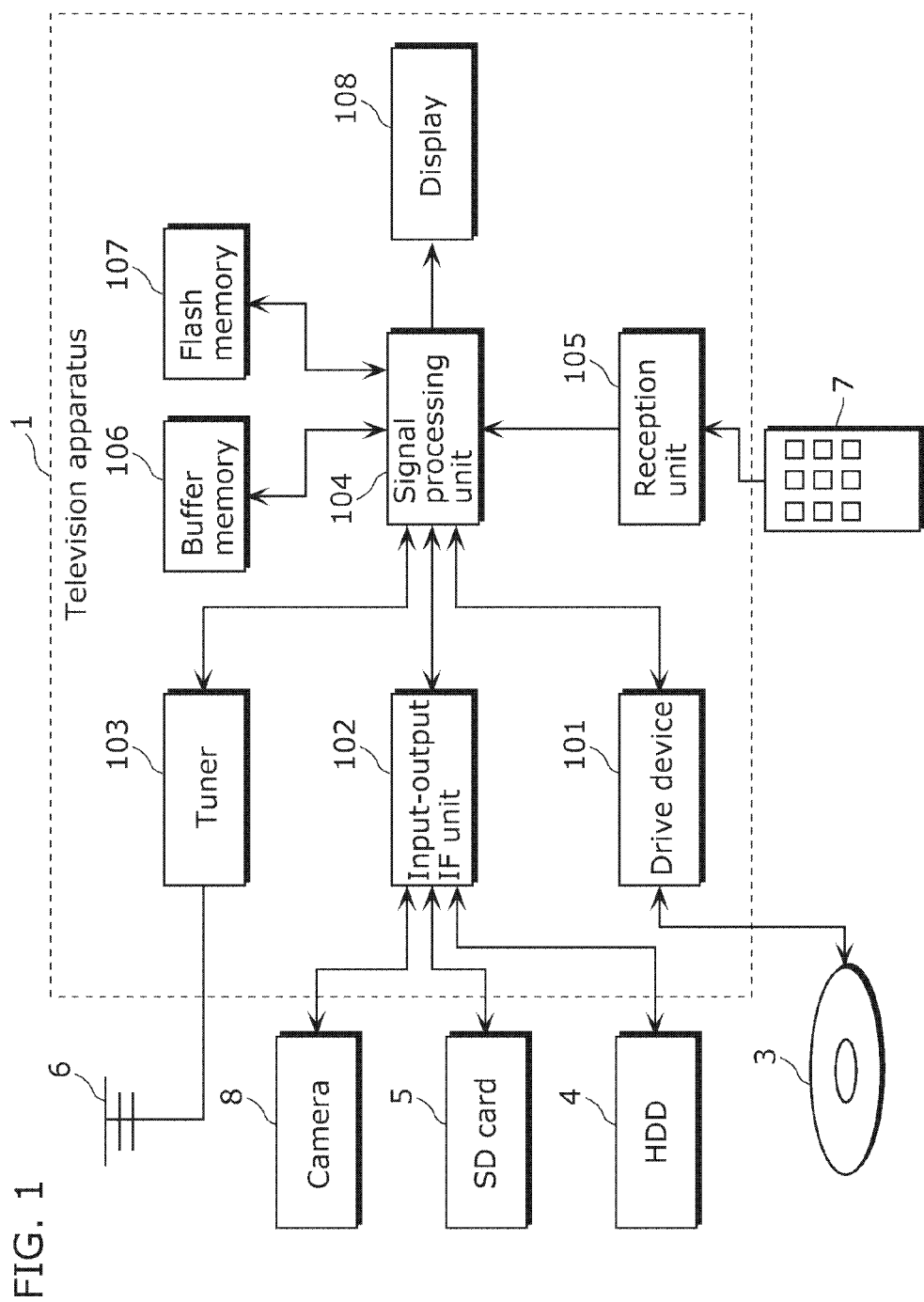
FIG. 1 is a diagram showing an overall structure of a television apparatus according to Embodiment 1.

FIG. 1 is a diagram showing an overall structure of the television apparatus according to this exemplary embodiment. As shown in FIG. 1, a television apparatus 1 is connected to an HDD (Hard Disc Drive) 4, an SD card 5, an antenna 6, and a camera 8. The television apparatus 1 obtains, as input, a video signal outputted from any of a BD (Blu-ray Disc (registered trademark)) 3, the HDD 4, the SD card 5, the antenna 6, and the camera 8. The television apparatus 1 processes the obtained video signal, and displays the processed video signal on a display 108 as video.

The television apparatus 1 also receives a manipulation signal sent from a remote control device 7 according to manipulation by a user.

The HDD 4 is a recording apparatus for storing a video signal. For example, the HDD 4 is realized by an external hard disc device or the like.

The SD card 5 is a recording medium for storing a video signal. The SD card 5 is an example of a memory card composed of a semiconductor memory device and the like.

The antenna 6 has a function of receiving a video signal sent from outside.

The remote control device 7 is a manipulation device that accepts manipulation by the user. The remote control device 7 has a plurality of buttons that can be pressed. Based on button manipulation, the remote control device 7 generates a manipulation signal indicating the manipulation by the user. The remote control device 7 sends the generated manipulation signal to the television apparatus 1 wirelessly. This allows the television apparatus 1 to detect the manipulation by the user.

The camera 8 is a camera that images the user. For example, the camera 8 is composed of an imaging device such as a CMOS sensor.

Note that the HDD 4, the antenna 6, the remote control device 7, the camera 8, and the like may be included in the television apparatus 1.

2. Specific Structure of Television Apparatus

The following describes a specific structure of the television apparatus 1, with reference to drawings.

In detail, the television apparatus 1 includes a drive device 101, an input-output IF unit (input-output interface unit) 102, a tuner 103, a signal processing unit 104, a reception unit 105, a buffer memory 106, a flash memory 107, and the display 108, as shown in FIG. 1.

The drive device 101 has a disc tray. The drive device 101 reads a video signal from the BD 3 placed on the disc tray. Moreover, in the case of receiving a video signal from the signal processing unit 104, the drive device 101 writes the received video signal to the BD 3 placed on the disc tray.

The input-output IF unit 102 is an interface connectable to any of external apparatuses such as the HDD 4, the SD card 5, and the camera 8. The input-output IF unit 102 enables transmission and reception of a control signal, a video signal, and the like between the signal processing unit 104 and the external apparatus. The input-output IF unit 102 sends an input stream received from the HDD 4, the SD card 5, or the camera 8, to the signal processing unit 104. The input-output IF unit 102 also sends a bitstream or an uncompressed video stream received from the signal processing unit 104, to the HDD 4 or the SD card 5.

For example, the input-output IF unit 102 is realized by an HDMI connector, an SD card slot, a USB connector, and the like. Though the input-output IF unit 102 is shown as one block in FIG. 1, the card slot for the SD card 5, the connector for the HDD 4, and the USB connector for the camera 8 may be provided separately. That is, the input-output IF unit 102 may have any structure that realizes an interface with an external apparatus.

The tuner 103 obtains a broadcast wave received by the antenna 6. The tuner 103 sends a video signal of a specific frequency designated by the signal processing unit 104, to the signal processing unit 104. This allows the signal processing unit 104 to process the video signal of the specific frequency included in the broadcast wave and display the processed video signal on the display 108.

The signal processing unit 104 controls the whole television apparatus 1. In particular, the signal processing unit 104 controls the camera 8. The signal processing unit 104 performs image processing on a video signal obtained by the camera 8. The control of the camera 8 by the signal processing unit 104 includes power control, obtained image size change, frame rate change, white balance adjustment, and so on. Note that the control of the camera 8 by the signal processing unit 104 is not limited to such, and may be any control of the camera 8.

The signal processing unit 104 calculates position information (position) of the user's hand, based on the video signal obtained by the camera 8. For example, the position information of the hand is given by x-y plane coordinates, with the origin being an arbitrary point of two-dimensional video represented by the obtained video signal. The signal processing unit 104 may perform an image matching process on the obtained whole video signal, using a template prepared beforehand to indicate a hand shape. In this way, the signal processing unit 104 can detect the position information of the user's hand from the video signal.

The signal processing unit 104 also calculates a blur amount of a pointer, i.e. blur information indicating such a blur amount, based on the position information of the hand. The blur amount of the pointer means a blur amount of the user's hand when the user manipulates the pointer, or a display error of the pointer. The display error of the pointer is an error caused by signal processing, e.g. an error in sensor precision, quantization width, sampling precision, or the like.

That is, the blur amount of the pointer is not limited to a blur amount of the pointer on a GUI screen, and may also be a blur amount of position information for displaying the pointer. The position information may be a two-dimensional coordinate value of the pointer, or a spatial coordinate value of the user's hand. The signal processing unit 104 calculates an amount of change per unit time of the position indicated by the position information, as the blur amount.

Moreover, the signal processing unit 104 may calculate the blur amount from the position information, and may calculate the blur amount of the position information from the whole video signal obtained by the camera 8. Alternatively, the signal processing unit 104 may calculate the blur amount based on performance of the camera 8.

The signal processing unit 104 further generates a GUI screen which is a manipulation screen of the television apparatus 1. The GUI screen includes the pointer that operates according to the obtained position information of the hand, and one or more objects (also called display elements or display target objects) selectable with the pointer. The signal processing unit 104 outputs the generated GUI screen to the display 108.

The signal processing unit 104 may be composed of a microcomputer, or composed of a hard-wired circuit.

The reception unit 105 receives the manipulation signal from the remote control device 7, and sends the received manipulation signal to the signal processing unit 104. For example, the reception unit 105 is realized by an infrared sensor.

The buffer memory 106 is used as a working memory in the signal processing by the input-output IF unit 102. For example, the buffer memory 106 is realized by a DRAM.

The flash memory 107 stores a program executed by the signal processing unit 104 and the like. The flash memory 107 also stores GUI screen information for defining the GUI screen displayed on the display 108. The GUI screen is generated based on the GUI screen information stored in the flash memory 107.

The display 108 displays the video signal and the GUI screen processed by the signal processing unit 104, as images. For example, the display 108 is realized by a liquid crystal display or a plasma display.

(2-1. Signal Processing Unit)

The following describes a specific structure of the signal processing unit 104, with reference to drawings.

Figure 2:
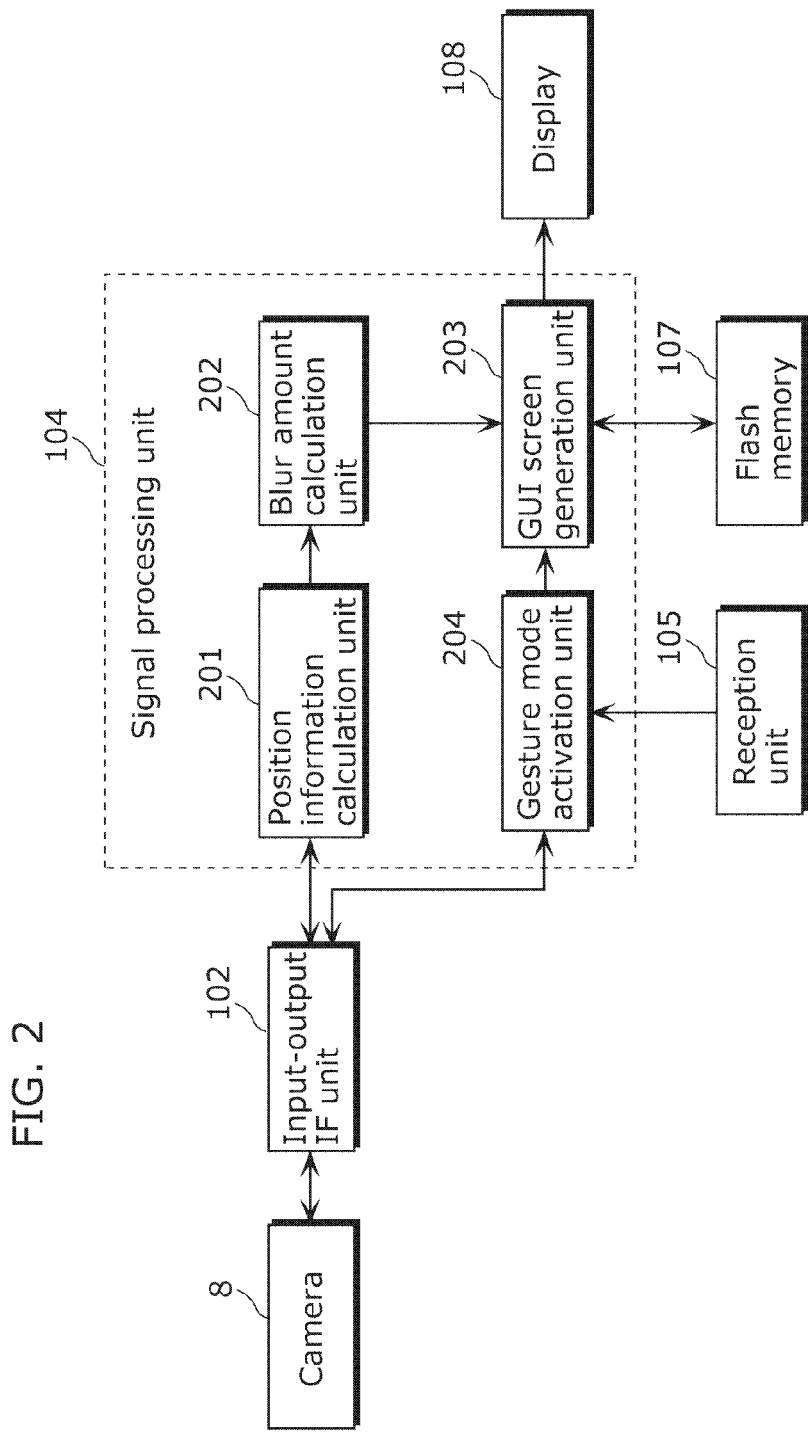
FIG. 2 is a functional block diagram showing a signal processing unit according to Embodiment 1.

FIG. 2 is a functional block diagram showing the signal processing unit 104.

As shown in FIG. 2, the signal processing unit 104 includes a position information calculation unit (position calculation unit) 201, a blur amount calculation unit 202, a GUI screen generation unit 203, and a gesture mode activation unit 204.

The position information calculation unit 201 receives the video signal obtained by the camera 8, via the input-output IF unit 102. The position information calculation unit 201 performs image processing such as pattern matching, on the received video signal. The pattern matching is image processing for extracting an image of the user's hand from the video signal. The position information calculation unit 201 calculates the position information of the user's hand, as a result of the image processing.

In detail, the position information of the hand is calculated as a two-dimensional coordinate value in a video region represented by the video signal. For instance, the position information of the hand is calculated as a two-dimensional coordinate value (x, y), with the origin being at the top left of the video region. The position information calculation unit 201 outputs the calculated two-dimensional coordinate value to the blur amount calculation unit 202.

Note that the information obtained by the position information calculation unit 201 is not limited to the position information of the hand. The position information calculation unit 201 may obtain position information of a specific part of the user, from the video signal. In the case where a remote control for sending a signal is used in the manipulation, the position information calculation unit 201 may calculate position information of the remote control based on the signal sent from the remote control.

The blur amount calculation unit 202 calculates an average value of the position information of the hand per unit time, based on the two-dimensional coordinate value obtained from the position information calculation unit 201. In detail, the blur amount calculation unit 202 calculates an average value from two-dimensional coordinate values successively obtained for a predetermined time. The blur amount calculation unit 202 then calculates, as the blur amount, a maximum absolute difference between the average value and the two-dimensional coordinate values successively obtained for the predetermined time.

For example, the blur amount calculation unit 202 obtains a two-dimensional coordinate value $(x_i, y_i)$ as position information at time i. The blur amount calculation unit 202 successively obtains two-dimensional coordinate values at sampling intervals $\Delta t$, from time i to time n. The blur amount calculation unit 202 then calculates an average value $(x_{ave}, y_{ave})$ based on the obtained two-dimensional coordinate values. The average value $(x_{ave}, y_{ave})$ is given by Expression 1.

[Math. 1]

$$(x_{ave}, y_{ave}) = \left( \frac{1}{n-i+1} \sum_{t=i}^{n} x_t, \frac{1}{n-i+1} \sum_{t=i}^{n} y_t \right) \quad \text{(Expression 1)}$$

where n is a positive integer not less than i.

In this case, the blur amount calculation unit 202 calculates a blur amount $(\Delta x, \Delta y)$ according to Expression 2.

[Math. 2]

$$(\Delta x, \Delta y) = (\max(|x_t - x_{ave}|), \max(|y_t - y_{ave}|)) \quad \text{(Expression 2)}$$

where $(x_t, y_t)$ is each two-dimensional coordinate value obtained from time i to time n. Thus, the blur amount calculation unit 202 calculates, as the blur amount, a maximum absolute difference between the average value calculated according to Expression 1 and the two-dimensional coordinate values successively obtained from time i to time n.

Note that the blur amount calculation method is not limited to the above-mentioned calculation method. The blur amount calculation unit 202 may use any value indicating the change of the hand position per unit time. As an example, the blur amount calculation unit 202 may calculate, as the blur amount, an average value of change amounts of the two-dimensional coordinate values successively obtained from time i to time n.

In the blur amount $(\Delta x, \Delta y)$, $\Delta x$ is a horizontal blur amount. In the case where the horizontal blur amount is not more than 50 pixels, the blur amount calculation unit 202 sets the horizontal blur amount as "small". In the case where the horizontal blur amount is more than 50 pixels and less than 100 pixels, the blur amount calculation unit 202 sets the horizontal blur amount as "medium". In the case where the horizontal blur amount is not less than 100 pixels, the blur amount calculation unit 202 sets the horizontal blur amount as "large".

Though the above describes the structure of setting the horizontal blur amount in three levels of "large", "medium", and "small", the blur amount calculation unit 202 may set the blur amount in multiple levels such as four levels, five levels, or six levels. Further, each threshold used when setting the blur amount as any of the levels may be determined according to a status of use by the user.

Moreover, the blur amount calculation unit 202 may set the blur amount on the basis of a unit other than pixels. For instance, the blur amount calculation unit 202 may directly use the spatial coordinate value of the position information of the hand.

In the blur amount $(\Delta x, \Delta y)$, $\Delta y$ is a vertical blur amount. In the case where the vertical blur amount is not more than 50 pixels, the blur amount calculation unit 202 sets the vertical blur amount as "small". In the case where the vertical blur amount is more than 50 pixels and less than 100 pixels, the blur amount calculation unit 202 sets the vertical blur amount as "medium". In the case where the vertical blur amount is not less than 100 pixels, the blur amount calculation unit 202 sets the vertical blur amount as "large".

Though the above describes the structure of setting the vertical blur amount in three levels of "large", "medium", and "small", the blur amount calculation unit 202 may set the blur amount in multiple levels such as four levels, five levels, or six levels. Further, each threshold used when setting the blur amount as any of the levels may be determined according to the status of use by the user.

Moreover, the blur amount calculation unit 202 may set the blur amount on the basis of a unit other than pixels. For instance, the blur amount calculation unit 202 may directly use the spatial coordinate value of the position information of the hand.

The blur amount calculation unit 202 may use a different number of levels between the horizontal blur amount and the vertical blur amount. In the case where gestures are used in the manipulation, a vertical change tends to occur due to gravitational influence. As an example, it is expected that, when the user is manipulating the television apparatus 1 using gestures, the user's hand suffers fatigue due to gravitational influence, causing an increase in vertical blur amount.

Accordingly, a structure of setting the vertical blur amount in more levels than the horizontal blur amount is preferable.

The blur amount calculation unit 202 may also use different thresholds between the horizontal blur amount and the vertical blur amount. For example, lower thresholds may be used for the vertical blur amount than the horizontal blur amount. In this way, more importance is placed on the blur amount of the hand in the vertical direction.

In more detail, for example, in the case where the vertical blur amount is not more than 40 pixels, the blur amount calculation unit 202 sets the vertical blur amount as "small". In the case where the vertical blur amount is more than 40 pixels and less than 80 pixels, the blur amount calculation unit 202 sets the vertical blur amount as "medium". In the case where the vertical blur amount is not less than 80 pixels, the blur amount calculation unit 202 sets the vertical blur amount as "large".

Thus, the blur amount calculation unit 202 may use thresholds determined based on an assumption that the vertical blur amount increases due to hand fatigue.

Note that the blur amount is a value indicating either blur caused by hand movement of the user or image processing precision. In detail, a large blur amount implies that the user is incapable of accurately manipulating the television apparatus 1 or the signal processing precision is low. Conversely, a small blur amount implies that the user is capable of accurately manipulating the television apparatus 1 or the signal processing precision is high.

Though the above describes the case where the blur amount calculation unit 202 calculates the vertical blur amount and the horizontal blur amount separately, the blur amount calculation unit 202 may instead calculate, as the blur amount, a maximum distance determined from the two-dimensional coordinate values successively obtained for the predetermined time and the average value of the two-dimensional coordinate values. Calculating the maximum distance as the blur amount makes it unnecessary for the blur amount calculation unit 202 to calculate the vertical blur amount and the horizontal blur amount separately. This contributes to a shorter processing time.

The blur amount is a value indicating the blur of the position information obtained by the position information calculation unit 201, and may be calculated by any calculation method.

The GUI screen generation unit 203 generates a GUI screen based on the blur amount calculated by the blur amount calculation unit 202 and the GUI screen information stored in the flash memory 107, upon receiving a signal from the gesture mode activation unit 204.

The GUI screen generation unit 203 also generates a GUI screen including a message to keep the hand stationary, based on the signal received from the gesture mode activation unit 204. The GUI screen generation unit 203 outputs the generated GUI screen to the display 108. The GUI screen generated by the GUI screen generation unit 203 will be described later.

The gesture mode activation unit 204 activates a gesture mode, based on a signal received via the reception unit 105. In the case of activating the gesture mode, the gesture mode activation unit 204 sends a power on signal to the camera 8 via the input-output IF unit 102. The power on signal is a signal for activating the camera 8. The gesture mode activation unit 204 also outputs a signal indicating the activation of the gesture mode, to the GUI screen generation unit 203.

3. Operation Flow

Figure 3:
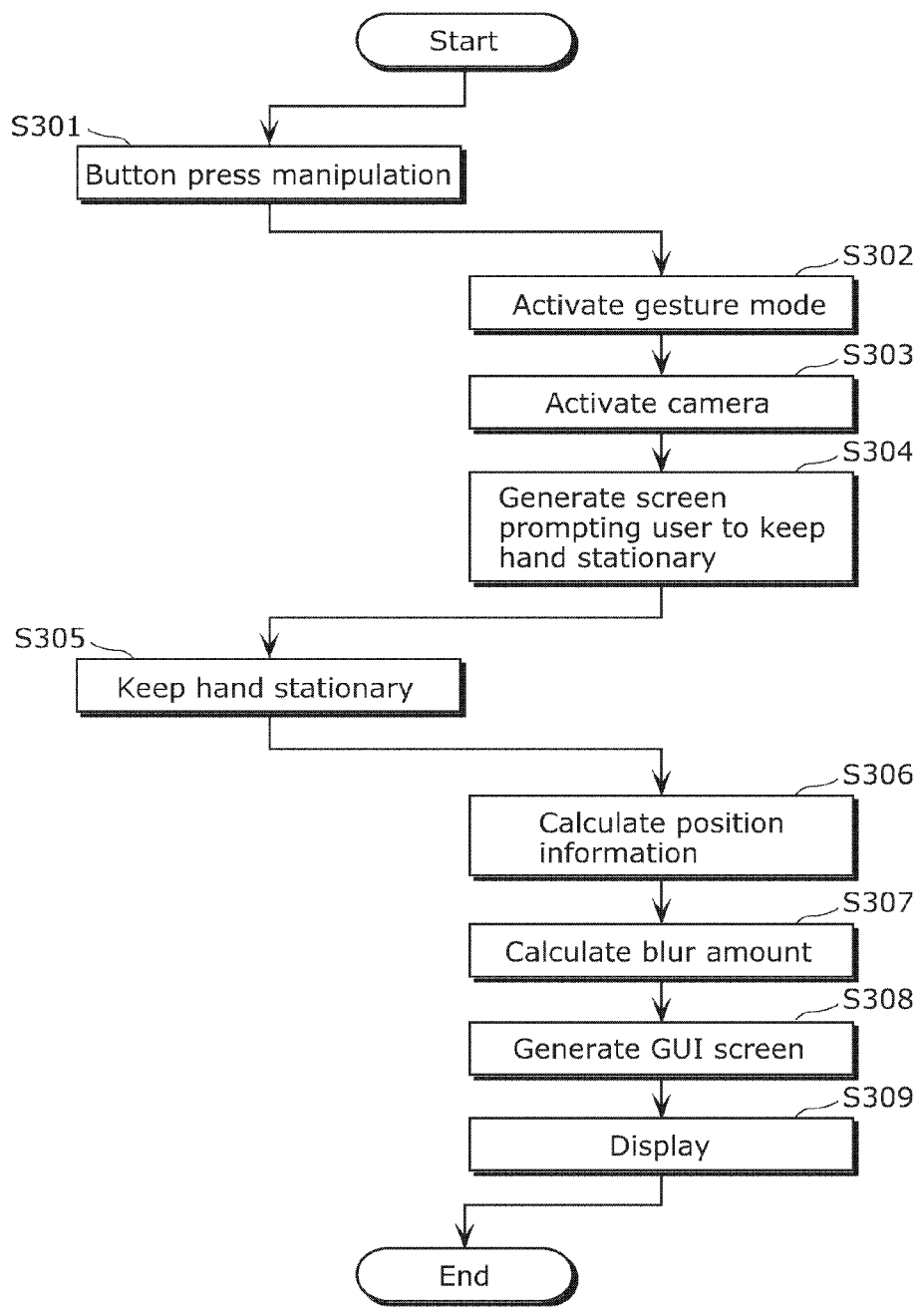
FIG. 3 is a flowchart showing an example of a process of generating a GUI screen and displaying the GUI screen on a display by the signal processing unit according to Embodiment 1.

FIG. 3 is a flowchart showing an example of a process of generating a GUI screen and displaying the generated GUI screen on the display 108 by the signal processing unit 104 according to this exemplary embodiment. An operation of receiving a manipulation signal via the remote control device 7 is described below, for convenience's sake.

The remote control device 7 accepts manipulation by the user, and sends a signal for activating the gesture mode to the reception unit 105. For example, the user presses a "gesture mode" button on the remote control device 7. The remote control device 7 accepts the manipulation by the press (Step S301).

Next, the gesture mode activation unit 204 receives the signal from the remote control device 7 via the reception unit 105. In the case where the received signal is a signal for activating the gesture mode, the gesture mode activation unit 204 activates the gesture mode (Step S302).

In the case of activating the gesture mode, the gesture mode activation unit 204 sends the power on signal to the camera 8 via the input-output IF unit 102. Upon receiving the power on signal, the camera 8 starts operation (Step S303). After executing initialization and the like, the camera 8 starts imaging of the user. The camera 8 outputs a signal obtained by the imaging, to the position information calculation unit 201 via the input-output IF unit 102.

The gesture mode activation unit 204 also outputs the signal indicating the activation of the gesture mode, to the GUI screen generation unit 203. Upon receiving this signal, the GUI screen generation unit 203 generates the GUI screen including the message to keep the hand stationary (Step S304).

Figure 4:
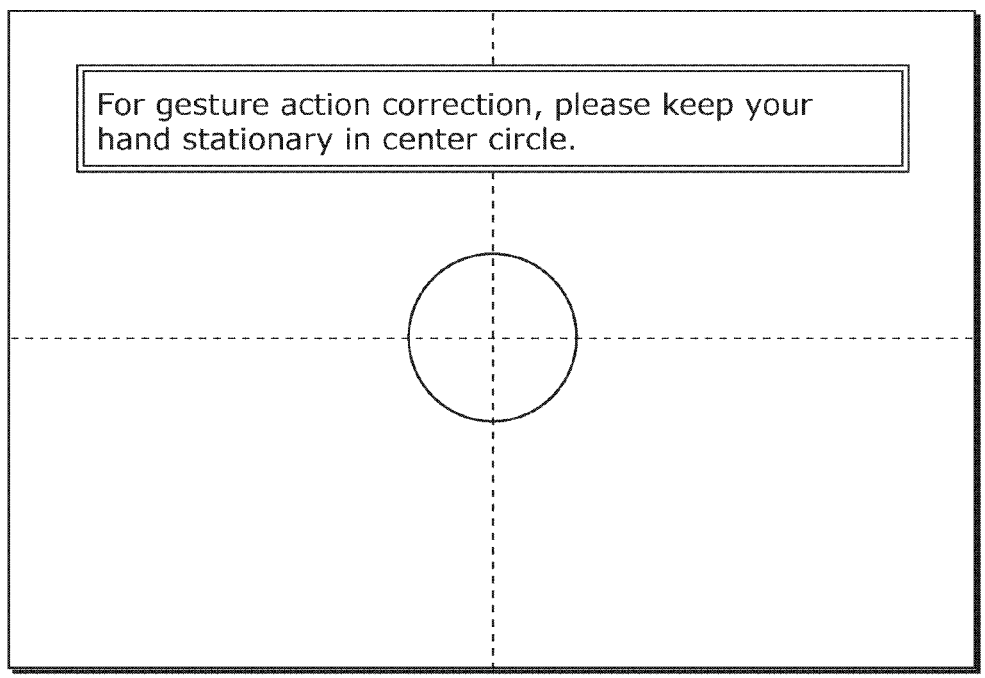
FIG. 4 is a diagram showing a message displayed on a GUI screen according to Embodiment 1.

FIG. 4 is a diagram showing the GUI screen including the message to keep the hand stationary.

The message to keep the hand stationary is added to the GUI screen shown in FIG. 4. In addition, guides are displayed in the horizontal and vertical directions, to help the user recognize whether or not the hand is stationary. Furthermore, an area in which the hand is to be kept stationary is displayed as a circle so that the user can recognize the area in which the hand is to be kept stationary. The television apparatus 1 thus puts the user's hand in a stationary state (Step S305).

Next, the position information calculation unit 201 successively receives video signals sent from the camera 8, via the input-output IF unit 102. The position information calculation unit 201 processes each received video signal, to calculate a two-dimensional coordinate value as the position information of the hand (Step S306). The position information calculation unit 201 outputs the calculated two-dimensional coordinate value to the blur amount calculation unit 202. Here, the position information calculation unit 201 executes image processing on the successively received video signals in sequence, and successively outputs the two-dimensional coordinate values as a result of the image processing.

The blur amount calculation unit 202 calculates a blur amount, from the two-dimensional coordinate values successively outputted from the position information calculation unit 201 (Step S307). The blur amount calculation unit 202 outputs the calculated blur amount to the GUI screen generation unit 203.

The GUI screen generation unit 203 generates a GUI screen, based on the blur amount received from the blur amount calculation unit 202 and the GUI screen information stored in the flash memory 107 (Step S308). The GUI screen generation unit 203 outputs the generated GUI screen to the display 108.

The display 108 displays the GUI screen received from the GUI screen generation unit 203 (Step S309).

4. GUI Screen

The following describes the GUI screen generated by the GUI screen generation unit 203, with reference to drawings.

The GUI screen generation unit 203 changes the GUI screen, based on the blur amount calculated by the blur amount calculation unit 202.

FIG. 5 is a diagram showing a table of GUI screen information stored in the flash memory 107.

For example, the GUI screen generation unit 203 references to a table including information of nine types of GUI screens defined according to the vertical blur amount and the horizontal blur amount, as shown in FIG. 5.

The table shown in FIG. 5 is a table corresponding to the vertical blur amount and the horizontal blur amount outputted from the blur amount calculation unit 202. In the table shown in FIG. 5, the blur amount is classified into three levels of "small", "medium", and "large", according to its magnitude. In the table shown in FIG. 5, the blur amount is classified as "small" in the case where the blur amount is not more than 50 pixels, classified as "medium" in the case where the blur amount is more than 50 pixels and less than 100 pixels, and classified as "large" in the case where the blur amount is not less than 100 pixels.

The GUI screen generation unit 203 generates one of the nine types of GUI screens, based on the classification of the blur amount. Hereafter, it is assumed that the GUI screen is virtually divided into six rows and six columns, for convenience's sake.

(First Pattern: in the Case where the Vertical Blur Amount is "Small" and the Horizontal Blur Amount is "Small")

The GUI screen generation unit 203 generates a GUI screen A, in the case where the vertical blur amount is "small" and the horizontal blur amount is "small".

Figure 6:
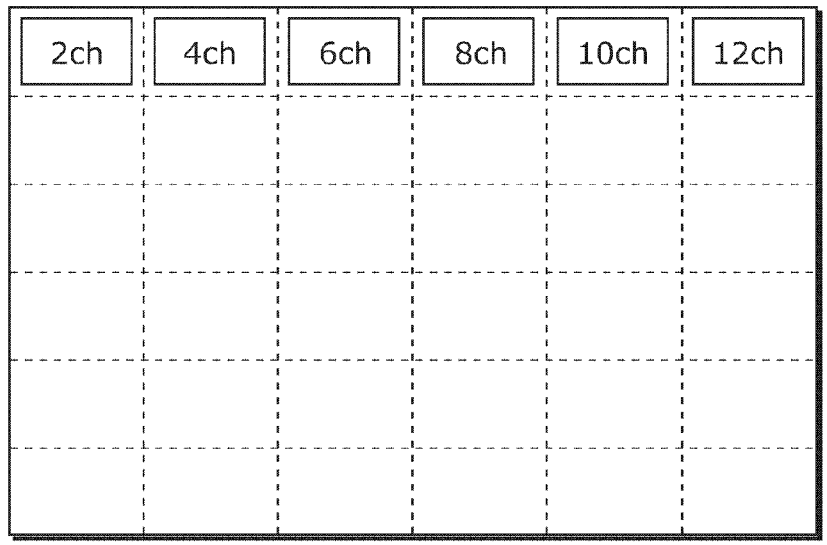
FIG. 6 is a diagram showing a GUI screen A according to Embodiment 1.

FIG. 6 is a diagram showing the GUI screen A. In FIG. 6, "2ch", "4ch", "6ch", "8ch", "10ch", and "12ch" are each an object (button) for selecting a channel.

The GUI screen A shown in FIG. 6 is a GUI screen generated in the case where the vertical blur amount is "small" and the horizontal blur amount is "small". In the case where the vertical blur amount and the horizontal blur amount are small, it is estimated that the user is in a situation where he or she is capable of accurate manipulation. Accordingly, each button arranged in the GUI screen A has a size of one row and one column. Thus, each button is generated in a small size because the user is capable of accurate manipulation with high precision.

Of the nine types of GUI screens, the GUI screen A has the smallest button size. Generating such small buttons enables gesture manipulation without reducing the viewable area of the video (program being viewed).

(Second Pattern: in the Case where the Vertical Blur Amount is "Medium" and the Horizontal Blur Amount is "Small")

The GUI screen generation unit 203 generates a GUI screen B, in the case where the vertical blur amount is "medium" and the horizontal blur amount is "small".

Figure 7:
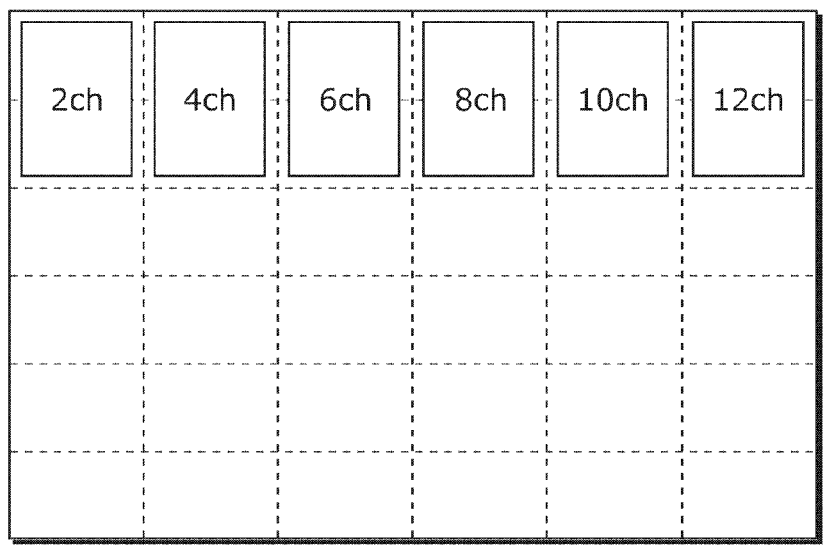
FIG. 7 is a diagram showing a GUI screen B according to Embodiment 1.

FIG. 7 is a diagram showing the GUI screen B. In FIG. 7, "2ch", "4ch", "6ch", "8ch", "10ch", and "12ch" are each an object (button) for selecting a channel.

In the case where the vertical blur amount is "medium", it is estimated that the user is in a situation where accurate manipulation in the vertical direction is more difficult than in the case where the vertical blur amount is "small". Accordingly, the GUI screen generation unit 203 generates the GUI screen B in which each button is larger in the vertical direction than in the GUI screen A, for example, each button has a size of two rows and one column.

Meanwhile, since the horizontal blur amount is small, the GUI screen generation unit 203 may set the horizontal size of each button arranged in the GUI screen B to be equal to the horizontal size of each button arranged in the GUI screen A.

Thus, the GUI screen generation unit 203 generates the GUI screen B in which each button is larger in the vertical direction. This enables accurate gesture manipulation to be performed even in the case where the vertical precision is low. Moreover, the GUI screen generation unit 203 generates the GUI screen B according to the direction of blur. This contributes to improved manipulability of the television apparatus 1 by gesture while minimizing the reduction of the viewable area of the video (program being viewed).

(Third Pattern: in the Case where the Vertical Blur Amount is "Large" and the Horizontal Blur Amount is "Small")

The GUI screen generation unit 203 generates a GUI screen C, in the case where the vertical blur amount is "large" and the horizontal blur amount is "small".

Figure 8:
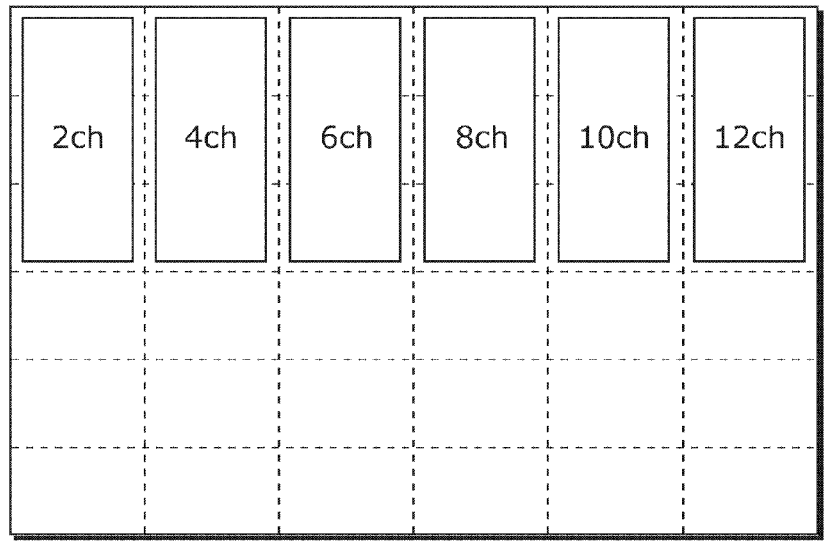
FIG. 8 is a diagram showing a GUI screen C according to Embodiment 1.

FIG. 8 is a diagram showing the GUI screen C. In FIG. 8, "2ch", "4ch", "6ch", "8ch", "10ch", and "12ch" are each an object (button) for selecting a channel.

In the case where the vertical blur amount is "large", it is estimated that the user is in a situation where accurate manipulation in the vertical direction is more difficult than in the case where the vertical blur amount is "medium". Accordingly, the GUI screen generation unit 203 generates the GUI screen C in which each button is larger in the vertical direction than in the GUI screen B, for example, each button has a size of three rows and one column. Since the vertical blur amount is "large" in this pattern, the vertical size of each button generated in the GUI screen C is largest of the nine types of GUI screens.

Thus, the GUI screen generation unit 203 can generate the GUI screen C corresponding to the situation where the vertical precision is low. In such a case, however, the viewable area of the video (program being viewed) is reduced, which causes a significant decrease in information amount. Hence, the GUI screen generation unit 203 may generate the GUI screen C so that each button is displayed in see through mode (transparently displayed). This can prevent a decrease in video visibility.

(Fourth Pattern: in the Case where the Vertical Blur Amount is "Small" and the Horizontal Blur Amount is "Medium")

The GUI screen generation unit 203 generates a GUI screen D, in the case where the vertical blur amount is "small" and the horizontal blur amount is "medium".

Figure 9:
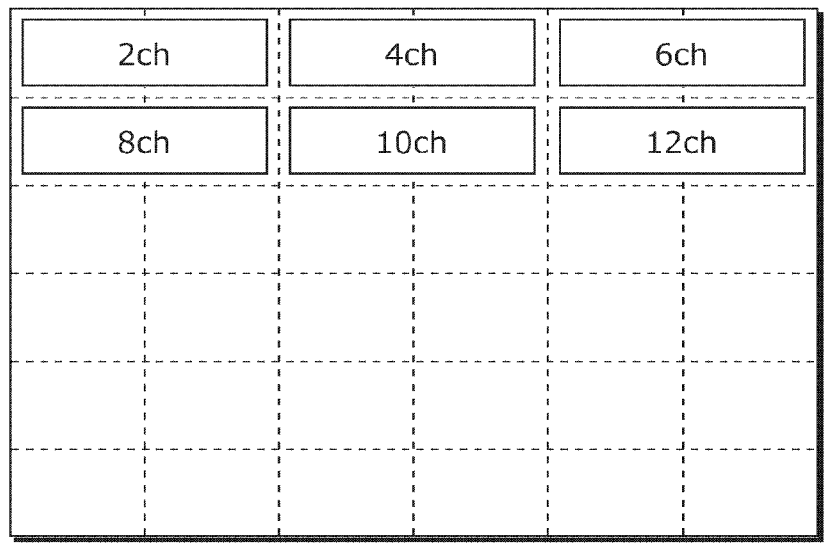
FIG. 9 is a diagram showing a GUI screen D according to Embodiment 1.

FIG. 9 is a diagram showing the GUI screen D. In FIG. 9, "2ch", "4ch", "6ch", "8ch", "10ch", and "12ch" are each an object (button) for selecting a channel.

In the case where the horizontal blur amount is "medium", it is estimated that the user is in a situation where accurate manipulation in the horizontal direction is more difficult than in the case where the horizontal blur amount is "small". Accordingly, the GUI screen generation unit 203 generates the GUI screen D in which each button is larger in the horizontal direction than in the GUI screen A, for example, each button has a size of one row and two columns.

Thus, the GUI screen generation unit 203 generates the GUI screen D in which each button is larger in the horizontal direction. As a result, the manipulability by gesture can be maintained even in the case where the horizontal precision is low.

Though all buttons are located on the upper side of the GUI screen D in FIG. 9, the 8ch button, the 10ch button, and the 12ch button of the GUI screen D may be located on the lower side of the GUI screen D. This can prevent a decrease in information amount of the center part of the GUI screen D. As a result, the manipulability by gesture and the visibility of the program being viewed can both be maintained.

(Fifth Pattern: in the Case where the Vertical Blur Amount is "Medium" and the Horizontal Blur Amount is "Medium")

The GUI screen generation unit 203 generates a GUI screen E, in the case where the vertical blur amount is "medium" and the horizontal blur amount is "medium".

Figure 10:
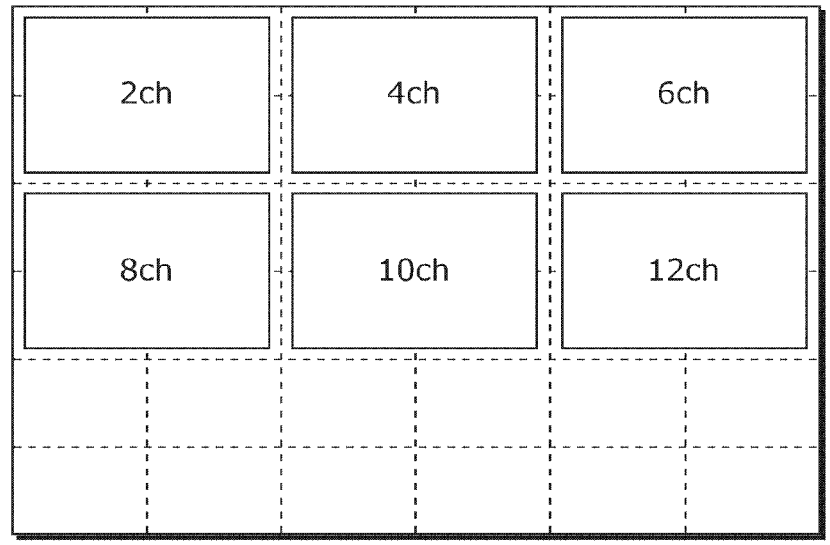
FIG. 10 is a diagram showing a GUI screen E according to Embodiment 1.

FIG. 10 is a diagram showing the GUI screen E. In FIG. 10, "2ch", "4ch", "6ch", "8ch", "10ch", and "12ch" are each an object (button) for selecting a channel.

In the case where the vertical blur amount is "medium" and the horizontal blur amount is "medium", it is estimated that the user is in a situation where accurate manipulation in the vertical direction and the horizontal direction is more difficult than in the case where the vertical blur amount is "small" and the horizontal blur amount is "small". Accordingly, the GUI screen generation unit 203 generates the GUI screen E in which each button is larger in the vertical direction and the horizontal direction than in the GUI screen A, for example, each button has a size of two rows and two columns.

(Sixth Pattern: in the Case where the Vertical Blur Amount is "Large" and the Horizontal Blur Amount is "Medium")

The GUI screen generation unit 203 generates a GUI screen F, in the case where the vertical blur amount is "large" and the horizontal blur amount is "medium".

Figure 11:
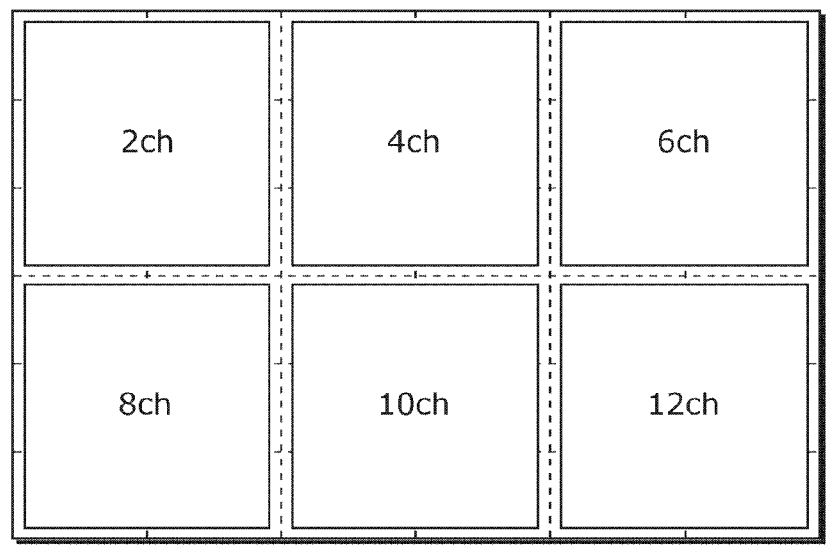
FIG. 11 is a diagram showing a GUI screen F according to Embodiment 1.

FIG. 11 is a diagram showing the GUI screen F. In FIG. 11, "2ch", "4ch", "6ch", "8ch", "10ch", and "12ch" are each an object (button) for selecting a channel.

In the case where the vertical blur amount is "large" and the horizontal blur amount is "medium", it is estimated that the user is in a situation where accurate manipulation in the vertical direction and the horizontal direction is difficult. Accordingly, the GUI screen generation unit 203 generates the GUI screen F in which each button is large in the vertical direction and the horizontal direction, for example, each button has a size of three rows and two columns. This makes the program being viewed less visible, but eases gesture manipulation. Note that the buttons for gesture manipulation may be displayed on the GUI screen only when the user performs gesture manipulation.

(Seventh Pattern: in the Case where the Vertical Blur Amount is "Small" and the Horizontal Blur Amount is "Large")

The GUI screen generation unit 203 generates a GUI screen G, in the case where the vertical blur amount is "small" and the horizontal blur amount is "large".

Figure 12:
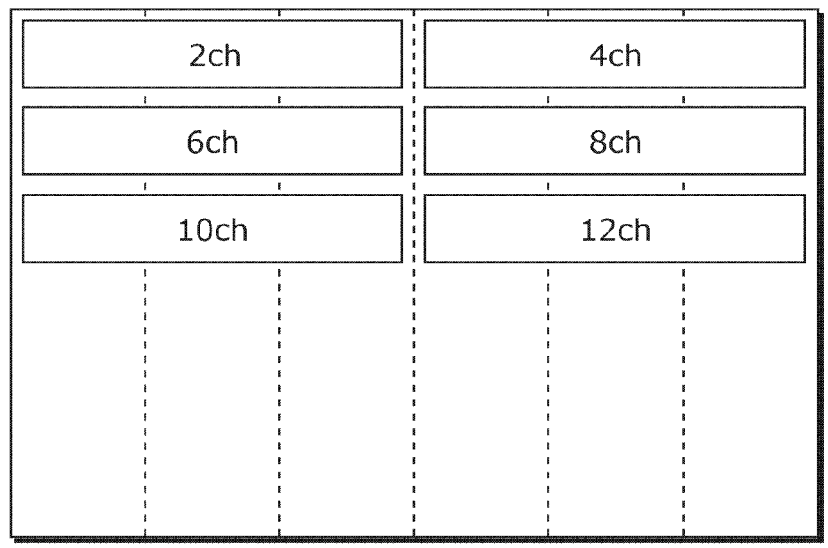
FIG. 12 is a diagram showing a GUI screen G according to Embodiment 1.

FIG. 12 is a diagram showing the GUI screen G. In FIG. 12, "2ch", "4ch", "6ch", "8ch", "10ch", and "12ch" are each an object (button) for selecting a channel.

In the case where the horizontal blur amount is "large", it is estimated that the user is in a situation where accurate manipulation in the horizontal direction is more difficult than in the case where the horizontal blur amount is "medium". Accordingly, the GUI screen generation unit 203 generates the GUI screen G in which each button is larger in the horizontal direction than in the GUI screen D, for example, each button has a size of one row and three columns. Since the horizontal blur amount is "large", the horizontal size of each button generated in the GUI screen G is largest of the nine types of GUI screens.

Thus, the GUI screen generation unit 203 can generate the GUI screen G corresponding to the situation where the horizontal precision is low. In such a case, however, the viewable area of the video (program being viewed) is reduced. Hence, the GUI screen generation unit 203 may generate the GUI screen G so that each button is displayed in see through mode (transparently displayed). This contributes to improved video visibility.

(Eighth Pattern: in the Case where the Vertical Blur Amount is "Medium" and the Horizontal Blur Amount is "Large")

The GUI screen generation unit 203 generates a GUI screen H, in the case where the vertical blur amount is "medium" and the horizontal blur amount is "large".

Figure 13:
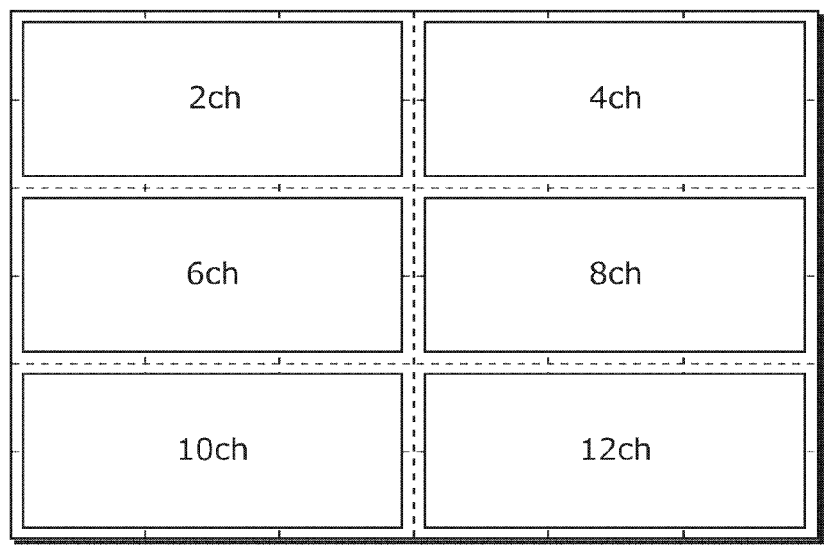
FIG. 13 is a diagram showing a GUI screen H according to Embodiment 1.

FIG. 13 is a diagram showing the GUI screen H. In FIG. 13, "2ch", "4ch", "6ch", "8ch", "10ch", and "12ch" are each an object (button) for selecting a channel.

In the case where the vertical blur amount is "medium" and the horizontal blur amount is "large", it is estimated that the user is in a situation where accurate manipulation in the vertical direction and the horizontal direction is difficult. In particular, it is estimated that accurate manipulation in the horizontal direction is difficult. Accordingly, the GUI screen generation unit 203 generates the GUI screen H in which each button is large in the vertical direction and the horizontal direction, for example, each button has a size of two rows and three columns.

This makes the program being viewed less visible, but eases gesture manipulation. Note that the buttons for gesture manipulation may be displayed on the GUI screen only when the user performs gesture manipulation.

(Ninth Pattern: in the Case where the Vertical Blur Amount is "Large" and the Horizontal Blur Amount is "Large")

The GUI screen generation unit 203 generates a GUI screen I, in the case where the vertical blur amount is "large" and the horizontal blur amount is "large".

Figure 14:
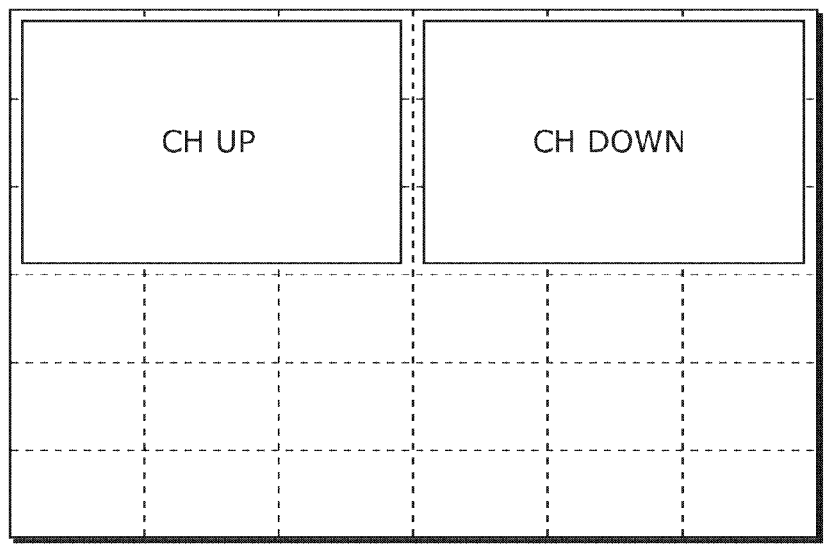
FIG. 14 is a diagram showing a GUI screen I according to Embodiment 1.

FIG. 14 is a diagram showing the GUI screen I. In FIG. 14, "CH UP" and "CH DOWN" are each an object (button) for selecting a channel.

In the case where the vertical blur amount is "large" and the horizontal blur amount is "large", it is estimated that the user is in a situation where accurate manipulation in the vertical direction and the horizontal direction is difficult. Accordingly, the GUI screen generation unit 203 generates the GUI screen I in which each button is large in the vertical direction and the horizontal direction, for example, each button has a size of three rows and three columns.

This makes the program being viewed less visible, but eases gesture manipulation. Note that the buttons for gesture manipulation may be displayed on the GUI screen only when the user performs gesture manipulation. Here, it is preferable to display only the channel up button and/or the channel down button on the GUI screen I. This allows each button to be displayed in large size while preventing a decrease in video visibility. The television apparatus 1 can thus achieve improvements in both visibility and manipulability.

Though this exemplary embodiment describes the case where the GUI screen generation unit 203 selects the appropriate GUI screen from the nine types of GUI screens according to the horizontal blur amount and the vertical blur amount, the GUI screen generation unit 203 may dynamically generate the GUI screen according to the horizontal blur amount and the vertical blur amount.

In this case, the GUI screen generation unit 203 may increase the horizontal size of each button arranged in the GUI screen as the horizontal blur amount increases, and increase the vertical size of each button arranged in the GUI screen as the vertical blur amount increases.

Though the above-mentioned GUI screen is virtually divided into six rows and six columns for convenience' sake, the GUI screen may not be divided. For example, the object size (dimension) may be calculated as a real value instead of on the division unit basis, according to the blur amount.

Though this exemplary embodiment describes the case where the blur amount is calculated beforehand using the GUI screen shown in FIG. 4, that is, the television apparatus 1 displays the appropriate GUI screen as a result of calibration executed prior to manipulation, the television apparatus 1 may dynamically calculate the blur amount during manipulation.

For instance, in the case where the user fails to select an object, the television apparatus 1 may calculate the blur amount according to the distance between the position of the pointer at the time of failure and the position of the object nearest the pointer. Thus, the television apparatus 1 can dynamically calculate the blur amount and display the appropriate GUI screen during gesture manipulation.

The GUI screen change according to this exemplary embodiment is typically useful in an environment in which the pointer is manipulated using gestures. However, the GUI screen may equally be changed in an environment in which the pointer is manipulated using a remote control, a touchpad, a mouse, or the like.

5. Conclusion

The television apparatus 1 according to this exemplary embodiment is the television apparatus 1 that operates according to manipulation by a user on a GUI screen, the television apparatus 1 including: the GUI screen generation unit 203 that generates the GUI screen, the GUI screen including an object selectable in the manipulation and a pointer for selecting the object; and the blur amount calculation unit 202 that calculates blur information indicating a blur amount of a position at which the pointer is displayed on the GUI screen, wherein the GUI screen generation unit 203 changes the GUI screen depending on the blur information.

With this, the television apparatus 1 can generate the appropriate GUI screen according to the blur information. The user can then manipulate the television apparatus 1 on the GUI screen according to blur, even in the case where blur caused by hand movement of the user or a display error caused by signal processing occurs. This contributes to improved manipulability of the television apparatus 1.

Moreover, the television apparatus 1 may further include: the camera 8 that obtains an image of the user by imaging the user; and the position information calculation unit 201 that calculates the position at which the pointer is displayed, from the image obtained by the camera 8, wherein the blur amount calculation unit 202 calculates the blur information indicating the blur amount of the position calculated by the position information calculation unit 201, from the image obtained by the camera 8.

With this, the television apparatus 1 calculates the position at which the pointer is displayed, based on the image of the user. The television apparatus 1 then generates the GUI screen according to blur of the image of the user. There is a high possibility that the image of the user is blurred due to a property of the camera 8 or an operation by the user. Even in such a case where the image of the user is blurred, the television apparatus 1 enables the user to appropriately select the object on the GUI screen according to the blur of the image.

Moreover, the GUI screen generation unit 203 may: change a size of the object included in the GUI screen depending on the blur information; and generate the GUI screen that includes the object having the changed size and the pointer.

With this, the television apparatus 1 can generate the GUI screen on which the object of the size according to blur is displayed. Therefore, even in the case where blur occurs, the user can manipulate the television apparatus 1 on the GUI screen on which the object of the size according to the blur is displayed.

Moreover, the GUI screen generation unit 203 may: generate the GUI screen that includes the object whose size is a first size and the pointer, in the case where the blur amount indicated by the blur information is a first value; and generate the GUI screen that includes the object whose size is a second size and the pointer, in the case where the blur amount indicated by the blur information is a second value larger than the first value, the second size being larger than the first size.

With this, the television apparatus 1 can increase the size of the object displayed on the GUI screen in the case where the blur amount is large. Therefore, even in the case where the blur amount is large, the user can appropriately select the object displayed on the GUI screen.

Moreover, the blur amount calculation unit 202 may calculate the blur information indicating at least one of a vertical blur amount and a horizontal blur amount.

With this, the television apparatus 1 can calculate blur in a predetermined direction, and change the GUI screen according to the blur in the predetermined direction.

Moreover, the blur amount calculation unit 202 may calculate the blur information indicating the vertical blur amount, wherein the GUI screen generation unit 203: generates the GUI screen that includes the object whose vertical size is the first size and the pointer, in the case where the vertical blur amount is the first value; and generates the GUI screen that includes the object whose vertical size is the second size and the pointer, in the case where the vertical blur amount is the second value.

With this, the television apparatus 1 can vertically increase the size of the object displayed on the GUI screen, in the case where the vertical blur amount is large. Therefore, even in the case where vertical blur occurs, the user can appropriately select the object displayed on the GUI screen.

Moreover, the blur amount calculation unit 202 may calculate the blur information indicating the horizontal blur amount, wherein the GUI screen generation unit 203: generates the GUI screen that includes the object whose horizontal size is the first size and the pointer, in the case where the horizontal blur amount is the first value; and generates the GUI screen that includes the object whose horizontal size is the second size and the pointer, in the case where the horizontal blur amount is the second value.

With this, the television apparatus 1 can horizontally increase the size of the object displayed on the GUI screen, in the case where the horizontal blur amount is large. Therefore, even in the case where horizontal blur occurs, the user can appropriately select the object displayed on the GUI screen.

Moreover, the GUI screen generation unit 203 may: determine the number of display target objects depending on the blur information calculated by the blur amount calculation unit 202, the display target objects being one or more objects that include the object and are displayed on the GUI screen; and generate the GUI screen on which the determined number of the display target objects are displayed.

With this, the television apparatus 1 can generate the GUI screen including the number of objects according to blur. Therefore, even in the case where blur occurs, the user can manipulate the television apparatus 1 on the GUI screen including the number of objects according to the blur.

Moreover, the GUI screen generation unit 203 may: determine a first number as the number of the display target objects and generate the GUI screen on which the first number of the display target objects are displayed, in the case where the blur amount indicated by the blur information is a first value; and determine a second number as the number of the display target objects and generate the GUI screen on which the second number of the display target objects are displayed, in the case where the blur amount indicated by the blur information is a second value larger than the first value, the second number being smaller than the first number.

With this, the television apparatus 1 can reduce the number of objects displayed on the GUI screen in the case where the blur amount is large, as compared with the case where the blur amount is small. Therefore, even in the case where the blur amount is large, the user can appropriately select the object.

Moreover, the blur amount calculation unit 202 may calculate the blur information indicating a vertical blur amount, wherein the GUI screen generation unit 203: determines the first number as the number of the display target objects displayed in the vertical direction and generates the GUI screen on which the first number of the display target objects are displayed in the vertical direction, in the case where the vertical blur amount is the first value; and determines the second number as the number of the display target objects displayed in the vertical direction and generates the GUI screen on which the second number of the display target objects are displayed in the vertical direction, in the case where the vertical blur amount is the second value.

With this, the television apparatus 1 can reduce the number of objects displayed in the vertical direction, in the case where the vertical blur amount is large. Therefore, even in the case where vertical blur occurs, the user can appropriately select the object displayed on the GUI screen.

Moreover, the blur amount calculation unit 202 may calculate the blur information indicating a horizontal blur amount, wherein the GUI screen generation unit 203: determines the first number as the number of the display target objects displayed in the horizontal direction and generates the GUI screen on which the first number of the display target objects are displayed in the horizontal direction, in the case where the horizontal blur amount is the first value; and determines the second number as the number of the display target objects displayed in the horizontal direction and generates the GUI screen on which the second number of the display target objects are displayed in the horizontal direction, in the case where the horizontal blur amount is the second value.

With this, the television apparatus 1 can reduce the number of objects displayed in the horizontal direction, in the case where the horizontal blur amount is large. Therefore, even in the case where horizontal blur occurs, the user can appropriately select the object displayed on the GUI screen.

6. Supplemental Remarks

Though the exemplary embodiment has been described above, this exemplary embodiment should not be construed as limiting in any manner.

Though the above describes a television apparatus as an example of the terminal apparatus according to this exemplary embodiment, the terminal apparatus according to this exemplary embodiment may be a set-top box that does not include the display 108. Alternatively, the terminal apparatus according to this exemplary embodiment may be a recorder. Thus, the terminal apparatus according to this exemplary embodiment may be any terminal apparatus that is manipulated by a user through a GUI screen.

Each means included in the terminal apparatus according to this exemplary embodiment may be provided as an integrated circuit or a program.

The program may be distributed via a recording medium such as a CD-ROM (Compact Disc-Read Only Memory) or a communication network such as the Internet.

The integrated circuit is typically realized as LSI (Large Scale Integration). The LSI may be composed of one chip, or composed of a plurality of chips. For example, the functional blocks other than the memory may be implemented by one-chip LSI. Though LSI is mentioned here, the circuit may be called IC (Integrated Circuit), system LSI, super LSI, ultra LSI, or the like, depending on the degree of integration.

The integrated circuit method is not limited to LSI, and may be realized by a dedicated circuit or a general-purpose processor. An FPGA (Field Programmable Gate Array) that can be programmed after LSI manufacturing or a reconfigurable processor capable of reconfiguring connections and settings of circuit cells in LSI may also be used.

When an integrated circuit technology that replaces LSI emerges from development of semiconductor technologies or other derivative technologies, such a technology may be used for the integration of the functional blocks. For instance, biotechnology may be adapted in this way.

Upon integration, the data storage unit alone from among the plurality of functional blocks may be provided as a separate structure without being incorporated in the one-chip structure.

Embodiment 2

Embodiment 2 describes a more specific example of use of the television apparatus 1 described in Embodiment 1. The television apparatus according to Embodiment 2 includes the same structural elements as the television apparatus 1 according to Embodiment 1.

Figure 15:
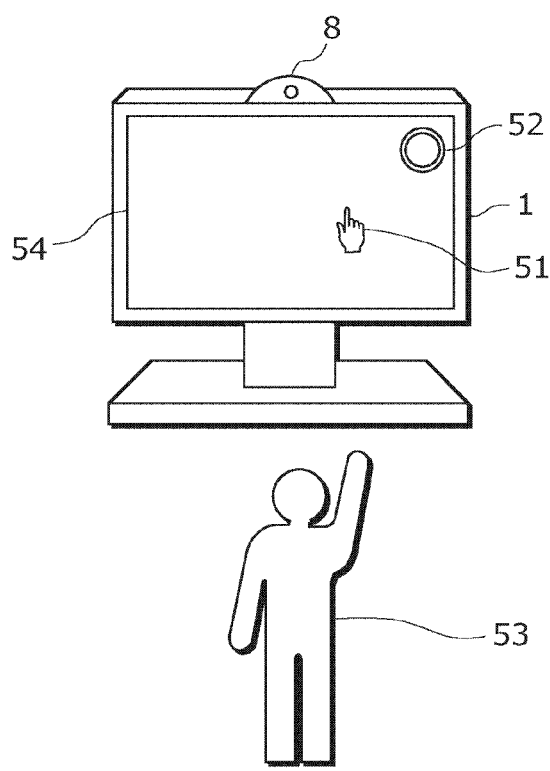
FIG. 15 is a diagram showing an example of use of a television apparatus according to Embodiment 2.

FIG. 15 is a diagram showing an example of use of the television apparatus according to Embodiment 2. A pointer 51 and an object 52 are displayed on a GUI screen 54 of the television apparatus 1 shown in FIG. 15. The camera 8 obtains an image of a user 53 by imaging the user 53. The television apparatus 1 calculates a position at which the pointer 51 is displayed, according to the image obtained by the camera 8.

That is, the television apparatus 1 determines the position of the pointer 51 according to the image of the user 53. The pointer 51 moves according to gestures of the user 53. In the case where the object 52 is selected with the pointer 51, the television apparatus 1 executes an operation associated with the object 52.

FIG. 16 is a diagram showing an example of the GUI screen 54 shown in FIG. 15. A screen example of the GUI screen 54 in the case of high position precision and a screen example of the GUI screen 54 in the case of low position precision are shown in FIG. 16. Here, the high position precision implies that the blur amount is small, and the low position precision implies that the blur amount is large.

The upper part of FIG. 16 shows the screen example in the case where the blur amount is small. In the screen example in the upper part, "1", "2", "3", . . . , "12", "Volume+", "Volume−", "CH+", "CH−", "Menu", "Program guide", and "Input select" are each an object on the GUI screen 54. A hand mark represents a pointer. As an example, in the case where "1" is selected with the pointer, the television apparatus 1 displays video of a program of channel 1.

In the example in the upper part of FIG. 16, the number of objects is relatively large, and the size of each object is relatively small. In the example in the upper part, the user can move the pointer to a desired position with high precision because the blur amount is small. Therefore, the user can appropriately manipulate the television apparatus 1 even through the complex GUI screen 54 as in the screen example in the upper part.

The lower part of FIG. 16 shows the screen example in the case where the blur amount is large. In the screen example in the lower part, "Volume+", "Volume−", "CH+", and "CH−"

are each an object on the GUI screen 54. A hand mark represents a pointer. As an example, in the case where "CH+" is selected with the pointer, the television apparatus 1 switches the channel by increasing the channel number.

In the example in the lower part of FIG. 16, the number of objects is relatively small, and the size of each object is relatively large. In the example in the lower part, the user has difficulty in moving the pointer to a desired position with high precision because the blur amount is large. Even in such a case where it is difficult to move the pointer with high precision, the user can appropriately select an object through the simplified GUI screen 54.

As described above, the television apparatus 1 changes the GUI screen 54 depending on whether the blur amount is small (first value) or large (second value). In the case where the blur amount is small, the number of objects is large (first number), and the size of each object is small (first size). In the case where the blur amount is large, the number of objects is small (second number), and the size of each object is large (second size).

The television apparatus 1 may reduce the size of each object while maintaining the number of objects, in the case where the blur amount is large. This increases each boundary (distance) between objects. A manipulation error of selecting a wrong object due to blur can thus be prevented.

Alternatively, the television apparatus 1 may reduce the number of objects while maintaining the size of each object, in the case where the blur amount is large. This simplifies the GUI screen 54 and improves manipulability.

Embodiment 3

A terminal apparatus according to Embodiment 3 includes characteristic structural elements of the television apparatus 1 described in each of Embodiments 1 and 2.

Figure 17:
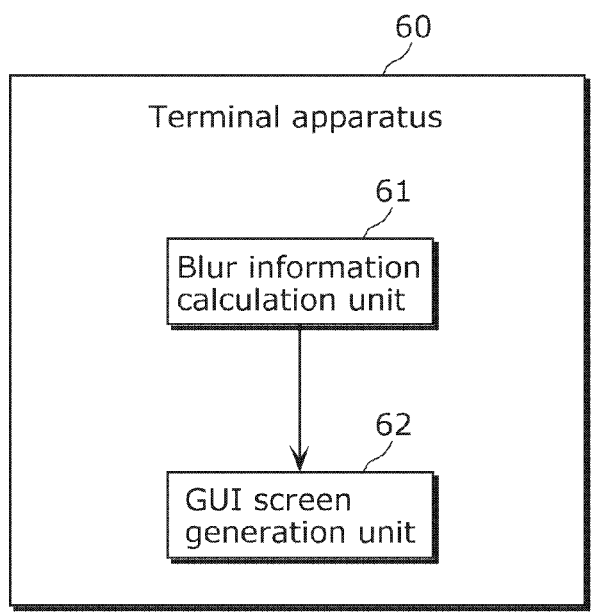
FIG. 17 is a block diagram showing a terminal apparatus according to Embodiment 3.

FIG. 17 is a block diagram showing the terminal apparatus according to Embodiment 3. A terminal apparatus 60 shown in FIG. 17 operates according to manipulation by a user on a GUI screen. The terminal apparatus 60 includes a blur information calculation unit (blur calculator) 61 and a GUI screen generation unit (generator) 62. The blur information calculation unit 61 corresponds to the blur amount calculation unit 202 according to Embodiment 1 shown in FIG. 2. The GUI screen generation unit 62 corresponds to the GUI screen generation unit 203 according to Embodiment 1 shown in FIG. 2.

The blur information calculation unit 61 calculates blur information. The blur information indicates a blur amount of a position at which a pointer is displayed on the GUI screen. The GUI screen includes an object selectable in the manipulation and the pointer for selecting the object.

The GUI screen generation unit 62 generates the GUI screen. The GUI screen generation unit 62 changes the GUI screen depending on the blur information.

Figure 18:
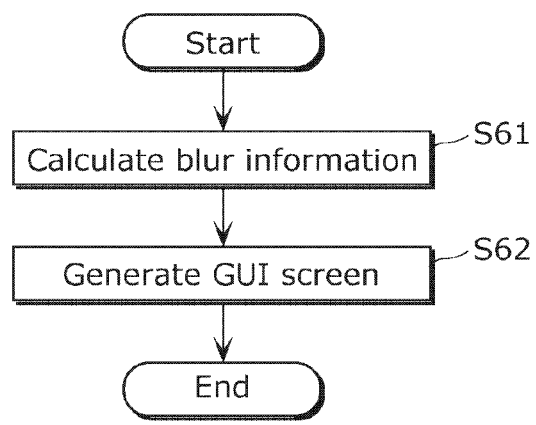
FIG. 18 is a flowchart showing an operation of the terminal apparatus according to Embodiment 3.

FIG. 18 is a flowchart showing an operation of the terminal apparatus 60 shown in FIG. 17. First, the blur information calculation unit 61 calculates the blur information (Step S61). Next, the GUI screen generation unit 62 generates the GUI screen (Step S62). Here, the GUI screen generation unit 62 changes the GUI screen depending on the blur information. For example, the GUI screen generation unit 62 changes a display state of the object depending on the blur information.

With this, the terminal apparatus 60 can generate the appropriate GUI screen according to the blur information. The user can then manipulate the terminal apparatus 60 on the GUI screen according to blur, even in the case where blur caused by hand movement of the user or a display error caused by signal processing occurs. This contributes to improved manipulability of the terminal apparatus 60.

Embodiment 4

A terminal apparatus according to Embodiment 4 has a structure in which structural elements corresponding to the camera 8 and the like described in Embodiment 1 are added to the terminal apparatus 60 according to Embodiment 3.

Figure 19:
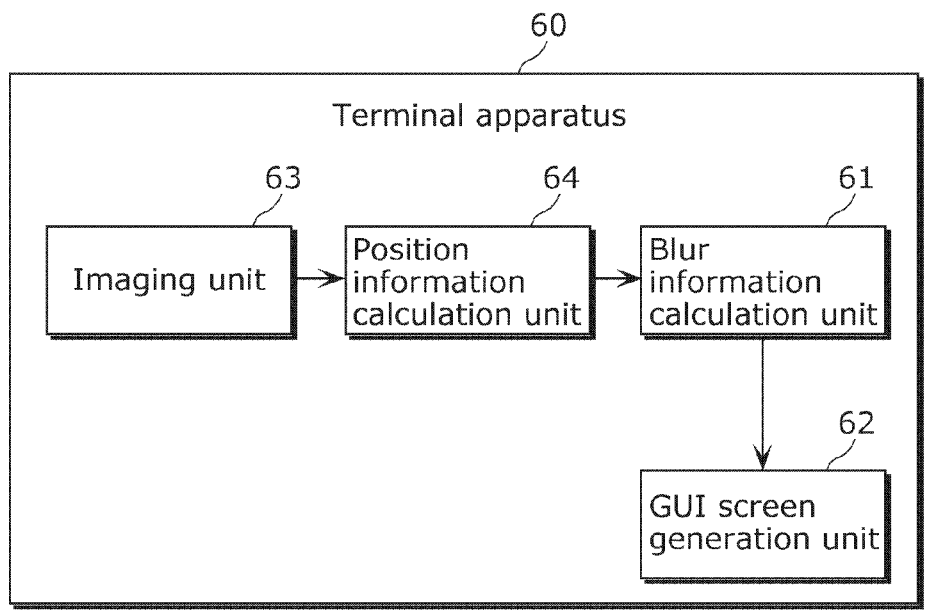
FIG. 19 is a block diagram showing a terminal apparatus according to Embodiment 4.

FIG. 19 is a block diagram showing the terminal apparatus according to Embodiment 4. The terminal apparatus 60 shown in FIG. 19 includes the blur information calculation unit 61, the GUI screen generation unit 62, an imaging unit (image sensor) 63, and a position information calculation unit (position calculation unit or position calculator) 64. The terminal apparatus 60 shown in FIG. 19 additionally includes the imaging unit 63 and the position information calculation unit 64, as compared with the terminal apparatus 60 according to Embodiment 3 shown in FIG. 17. The imaging unit 63 corresponds to the camera 8 according to Embodiment 1 shown in FIG. 2. The position information calculation unit 64 corresponds to the position information calculation unit 201 according to Embodiment 1 shown in FIG. 2.

The imaging unit 63 obtains an image of the user by imaging the user. The position information calculation unit 64 calculates the position at which the pointer is displayed, from the image obtained by the imaging unit 63. The blur information calculation unit 61 calculates the blur information indicating the blur amount of the position calculated by the position information calculation unit 64, from the image obtained by the imaging unit 63. The GUI screen generation unit 62 generates the GUI screen on which the pointer is displayed at the position calculated by the position information calculation unit 64. The GUI screen generation unit 62 changes the GUI screen depending on the blur information.

Figure 20:
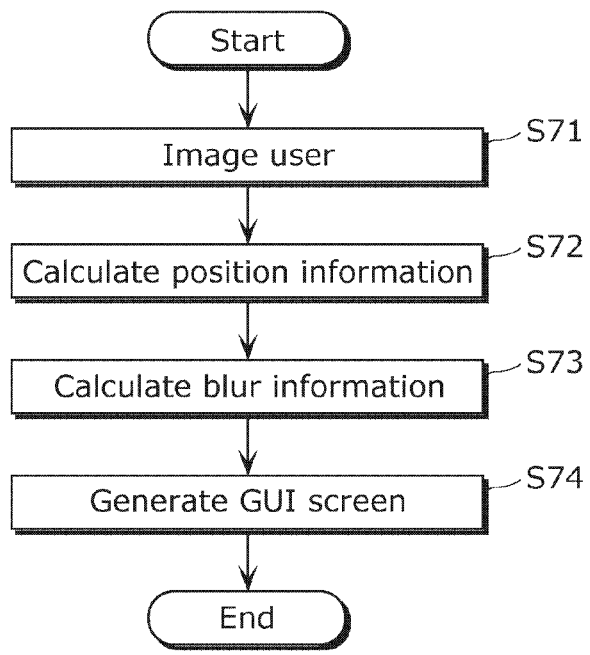
FIG. 20 is a flowchart showing an operation of the terminal apparatus according to Embodiment 4.

FIG. 20 is a flowchart showing an operation of the terminal apparatus 60 shown in FIG. 19. First, the imaging unit 63 obtains the image of the user by imaging the user (Step S71). The position information calculation unit 64 calculates the position at which the pointer is displayed, from the image obtained by the imaging unit 63 (Step S72).

The blur information calculation unit 61 calculates the blur information indicating the blur amount of the position calculated by the position information calculation unit 64, from the image obtained by the imaging unit 63 (Step S73). Here, the blur information calculation unit 61 may calculate the blur information using the position calculated from the image obtained by the imaging unit 63. Alternatively, the blur information calculation unit 61 may calculate the blur information from the whole image obtained by the imaging unit 63.

In particular, the blur information calculation unit 61 may calculate the blur information before the information of the position is converted to a coordinate value of the pointer on the GUI screen, or calculate the blur information after the information of the position is converted to the coordinate value of the pointer on the GUI screen.

The GUI screen generation unit 62 generates the GUI screen on which the pointer is displayed at the position calculated by the position information calculation unit 64 (Step S74). Here, the GUI screen generation unit 62 changes the GUI screen depending on the blur information.

With this, the terminal apparatus 60 calculates the position at which the pointer is displayed, based on the image of the user. The terminal apparatus 60 then generates the GUI screen according to blur of the image of the user. There is a high possibility that the image of the user is blurred due to a property of the imaging unit 63 or an operation by the user.

Even in such a case where the image of the user is blurred, the terminal apparatus 60 enables the user to appropriately select the object on the GUI screen according to the blur of the image.

The herein disclosed subject matter is to be considered descriptive and illustrative only, and the appended Claims are of a scope intended to cover and encompass not only the particular embodiment(s) disclosed, but also equivalent structures, methods, and/or uses.

For example, a process executed by a specific processing unit may be executed by another processing unit. Processes may be executed in different order, and two or more processes may be executed in parallel.

The herein disclosed subject matter can be realized not only as a terminal apparatus, but also as a method including steps corresponding to the processing units included in the terminal apparatus. As an example, these steps are executed by a computer. The herein disclosed subject matter can also be realized as a program for causing the computer to execute the steps included in such a method. The herein disclosed subject matter can further be realized as a computer-readable recording medium such as a CD-ROM on which the program is recorded.

Structural elements included in the terminal apparatus may be realized by LSI (Large Scale Integration) which is an integrated circuit. The structural elements may each be individually implemented as one chip, or may be partly or wholly implemented on one chip. As an example, the structural elements other than the storage unit may be implemented as one chip. Though LSI is mentioned here, the circuit may be called IC (Integrated Circuit), system LSI, super LSI, ultra LSI, or the like, depending on the degree of integration.

The integrated circuit method is not limited to LSI, and may be realized by a dedicated circuit or a general-purpose processor. A FPGA (Field Programmable Gate Array) which can be programmed or a reconfigurable processor which is capable of reconfiguring connections and settings of circuit cells in LSI may also be used.

When an integrated circuit technology that replaces LSI emerges from development of semiconductor technologies or other derivative technologies, such a technology may be used for the integration of the structural elements included in the terminal apparatus.

INDUSTRIAL APPLICABILITY

The terminal apparatus according to one or more exemplary embodiments disclosed herein provides a GUI screen according to blur, and is therefore applicable to a television apparatus, a video recorder, a video camera, a digital camera, a personal computer, a camera mobile phone, and so on.

The invention claimed is:

1. A terminal apparatus that operates according to manipulation by a user on a Graphical User Interface (GUI) screen, the terminal apparatus comprising:
   a display device which displays the GUI screen;
   a generator that generates the GUI screen, the GUI screen including a button selectable in the manipulation and a pointer for selecting the button; and
   a blur calculator that calculates a blur amount including a vertical blur amount and a horizontal blur amount of a position at which the pointer is displayed on the GUI screen,
   wherein the generator changes the GUI screen in a vertical direction depending on the vertical blur amount, and changes the GUI screen in a horizontal direction depending on the horizontal blur amount,
   the blur amount being determined utilizing successive pointer position readings indicating the position of the pointer, and
   wherein the generator:
   determines the number of vertical display target buttons depending on the vertical blur amount calculated by the blur calculator, the vertical display target buttons being one or more buttons that include the button and are displayed in the vertical direction;
   determines the number of horizontal display target buttons depending on the horizontal blur amount calculated by the blur calculator, the horizontal display target buttons being one or more buttons that include the button and are displayed in the horizontal direction; and
   generates the GUI screen on which the determined number of the vertical display target buttons are displayed in the vertical direction and the determined number of the horizontal display target buttons are displayed in the horizontal direction.

2. The terminal apparatus according to claim 1, wherein the generator:
   determines a first number as the number of the vertical display target buttons displayed in the vertical direction and generates the GUI screen on which the first number of the vertical display target buttons are displayed in the vertical direction, in the case where the vertical blur amount is a first value; and
   determines a second number as the number of the vertical display target buttons displayed in the vertical direction and generates the GUI screen on which the second number of the vertical display target buttons are displayed in the vertical direction, in the case where the vertical blur amount is a second value larger than the first value, the second number being smaller than the first number.

3. The terminal apparatus according to claim 1, wherein the generator:
   determines a third number as the number of the horizontal display target buttons displayed in the horizontal direction and generates the GUI screen on which the third number of the horizontal display target buttons are displayed in the horizontal direction, in the case where the horizontal blur amount is a third value; and
   determines a fourth number as the number of the horizontal display target buttons displayed in the horizontal direction and generates the GUI screen on which the fourth number of the horizontal display target buttons are displayed in the horizontal direction, in the case where the horizontal blur amount is a fourth value larger than the third value, the fourth number being smaller than the third number.

4. The terminal apparatus according to claim 1, wherein the generator generates the GUI screen on which the determined number of the vertical display target buttons are displayed in the vertical direction and the determined number of the horizontal display target buttons are displayed in the horizontal direction, while maintaining a size of each of the vertical display target buttons and the horizontal display target buttons.

5. A terminal apparatus that operates according to manipulation by a user on a Graphical User Interface (GUI) screen, the terminal apparatus comprising:
   a display device which displays the GUI screen;
   a generator that generates the GUI screen, the GUI screen including an object a button selectable in the manipulation and a pointer for selecting the button; and a blur calculator that calculates a blur amount including a vertical blur amount and a horizontal blur amount of a position at which the pointer is displayed on the GUI screen, wherein the generator changes the GUI screen in a vertical direction depending on the vertical blur amount, and changes the GUI screen in a horizontal direction depending on the horizontal blur amount, the blur amount being determined utilizing successive pointer position readings indicating the position of the pointer, and wherein the generator:

generates the GUI screen on which a plurality of buttons including the button are displayed, only in the case where a calculated blur amount is a first value from among the first value and a second value larger than the first value, the calculated blur amount being the calculated vertical blur amount or the calculated horizontal blur amount; and generates the GUI screen on which a substitute button is displayed, in the case where the calculated blur amount is the second value, the substitute button being a button selectable in the manipulation and substituted for the plurality of buttons.

6. The terminal apparatus according to claim 5, wherein the generator:

generates the GUI screen on which the plurality of buttons are displayed, only in the case where the calculated blur amount is the first value from among the first value and the second value, the plurality of buttons being buttons for selecting numbers in the manipulation; and generates the GUI screen on which the substitute button is displayed, in the case where the calculated blur amount is the second value, the substitute button being a button for increasing or decreasing a number in the manipulation.

7. The terminal apparatus according to claim 6, wherein the generator:

generates the GUI screen on which the plurality of buttons are displayed, only in the case where the calculated blur amount is the first value from among the first value and the second value, the plurality of buttons being buttons for selecting channel numbers in the manipulation; and generates the GUI screen on which the substitute button is displayed, in the case where the calculated blur amount is the second value, the substitute button being a button for increasing or decreasing a channel number in the manipulation.

8. A terminal apparatus that operates according to manipulation by a user on a Graphical User Interface (GUI) screen, the terminal apparatus comprising:

a display device which displays the GUI screen;

a generator that generates the GUI screen, the GUI screen including a plurality of buttons each of which is selectable in the manipulation and a pointer for selecting one of the plurality of buttons; and a blur calculator that calculates a blur amount of a position at which the pointer is displayed on the GUI screen, the blur amount being determined utilizing successive pointer position readings indicating the position of the pointer, wherein the generator:

generates the GUI screen on which the plurality of buttons are displayed, only in the case where the calculated blur amount is a first value from among the first value and a second value larger than the first value; and generates the GUI screen on which a substitute button is displayed, in the case where the calculated blur amount is the second value, the substitute button being a button selectable in the manipulation and substituted for the plurality of buttons.

9. The terminal apparatus according to claim 8, wherein the generator:

generates the GUI screen on which the plurality of buttons are displayed, only in the case where the calculated blur amount is the first value from among the first value and the second value, the plurality of buttons being buttons for selecting numbers in the manipulation; and generates the GUI screen on which the substitute button is displayed, in the case where the calculated blur amount is the second value, the substitute button being a button for increasing or decreasing a number in the manipulation.

10. The terminal apparatus according to claim 9, wherein the generator:

generates the GUI screen on which the plurality of buttons are displayed, only in the case where the calculated blur amount is the first value from among the first value and the second value, the plurality of buttons being buttons for selecting channel numbers in the manipulation; and generates the GUI screen on which the substitute button is displayed, in the case where the calculated blur amount is the second value, the substitute button being a button for increasing or decreasing a channel number in the manipulation.

11. A GUI screen generation method of generating a Graphical User Interface (GUI) screen for manipulation by a user, the GUI screen generation method comprising:

generating the GUI screen, the GUI screen including a button selectable in the manipulation and a pointer for selecting the button; and calculating a blur amount including a vertical blur amount and a horizontal blur amount of a position at which the pointer is displayed on the GUI screen, the blur amount being determined utilizing successive pointer position readings indicating the position of the pointer, wherein the generating includes changing the GUI screen in a vertical direction depending on the vertical blur amount, and changing the GUI screen in a horizontal direction depending on the horizontal blur amount, generating the GUI screen on which a plurality of buttons including the button are displayed, only in the case where a calculated blur amount is a first value from among the first value and a second value larger than the first value, the calculated blur amount being the calculated vertical blur amount or the calculated horizontal blur amount; and generating the GUI screen on which a substitute button is displayed, in the case where the calculated blur amount is the second value, the substitute button being a button selectable in the manipulation and substituted for the plurality of buttons.

12. A non-transitory computer-readable recording medium for use in a computer, the recording medium having a computer program recorded thereon for causing the computer to execute the GUI screen generation method according to claim 11.

* * * * *